United States Patent
Zeng et al.

(10) Patent No.: US 11,490,408 B2
(45) Date of Patent: *Nov. 1, 2022

(54) NETWORK CONFIGURED UPLINK CONTROL FEEDBACK FOR 5G NEW RADIO (NR)

(71) Applicant: QUALCOMM Incorporated, San Diego, CA (US)

(72) Inventors: Wei Zeng, Saratoga, CA (US); Jing Jiang, San Diego, CA (US); Wanshi Chen, San Diego, CA (US); Tingfang Ji, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 658 days.

This patent is subject to a terminal disclaimer.

(21) Appl. No.: 16/510,599

(22) Filed: Jul. 12, 2019

(65) Prior Publication Data

US 2019/0335490 A1 Oct. 31, 2019

Related U.S. Application Data

(63) Continuation of application No. 15/934,801, filed on Mar. 23, 2018, now Pat. No. 10,485,016, which is a
(Continued)

(51) Int. Cl.
*H04W 72/12* (2009.01)
*H04L 5/00* (2006.01)
(Continued)

(52) U.S. Cl.
CPC ........... *H04W 72/1284* (2013.01); *H04L 1/12* (2013.01); *H04L 1/1887* (2013.01);
(Continued)

(58) Field of Classification Search
CPC ........... H04W 72/0446; H04W 72/042; H04W 28/18; H04W 72/1278; H04W 72/082;
(Continued)

(56) References Cited

U.S. PATENT DOCUMENTS 9,723,516 B2 * 8/2017 Bhushan ................... H04L 5/14
10,091,810 B2 10/2018 Zeng et al.
(Continued)

FOREIGN PATENT DOCUMENTS

CN 102726109 A 10/2012
CN 104488341 A 4/2015

OTHER PUBLICATIONS

International Search Report and Written Opinion—PCT/US2017/052814—ISA/EPO—dated Nov. 8, 2017.
(Continued)

*Primary Examiner* — Awet Haile
(74) *Attorney, Agent, or Firm* — Loza & Loza, LLP

(57) ABSTRACT

Some aspects of the disclosure provide for wireless communication systems in which scheduling information is transmitted to a scheduled entity to schedule transmission of uplink feedback control information by the scheduled entity. The feedback control information may be transmitted in short uplink control bursts or long uplink bursts. Selection between short uplink control bursts and long uplink bursts may be based on power headroom at the scheduled entity, interference in the short uplink control burst or the long uplink burst, loading of the short uplink control burst or the long uplink burst or processing capability of the scheduled entity.

30 Claims, 13 Drawing Sheets

Related U.S. Application Data continuation of application No. 15/710,771, filed on Sep. 20, 2017, now Pat. No. 10,091,810.

(60) Provisional application No. 62/417,789, filed on Nov. 4, 2016.

(51) Int. Cl.
  *H04L 1/18* (2006.01)
  *H04L 1/12* (2006.01)
  *H04W 52/36* (2009.01)

(52) U.S. Cl.
  CPC .......... *H04L 1/1896* (2013.01); *H04L 5/0055* (2013.01); *H04L 5/0092* (2013.01); *H04W 72/1215* (2013.01); *H04W 72/1268* (2013.01); *H04L 1/1854* (2013.01); *H04L 5/0053* (2013.01); *H04W 52/365* (2013.01)

(58) Field of Classification Search
  CPC ......... H04W 72/1268; H04W 72/1289; H04W 76/02; H04W 88/02; H04W 8/18; H04L 5/0055; H04L 5/1469; H04L 1/08
  See application file for complete search history.

(56) References Cited

U.S. PATENT DOCUMENTS

| | | | |
|---|---|---|---|
| 2014/0169319 A1 | 6/2014 | Yang et al. | |
| 2015/0009897 A1 | 1/2015 | Wilhelmsson et al. | |
| 2016/0020891 A1* | 1/2016 | Jung | H04L 5/1469 370/280 |
| 2016/0270115 A1 | 9/2016 | Mukkavilli et al. | |
| 2017/0280469 A1* | 9/2017 | Park | H04W 72/0446 |
| 2017/0367059 A1 | 12/2017 | Park et al. | |
| 2018/0123767 A1* | 5/2018 | Islam | H04L 1/1816 |
| 2018/0213554 A1 | 7/2018 | Zeng et al. | |
| 2018/0368176 A1 | 12/2018 | Sun et al. | |
| 2019/0058556 A1* | 2/2019 | Siomina | H04L 5/0048 |
| 2019/0223201 A1* | 7/2019 | Lee | H04W 72/0413 |
| 2020/0153600 A1* | 5/2020 | Tiirola | H04L 5/0057 |

OTHER PUBLICATIONS

Qualcomm Incorporated: "UL Control Channels Overview", 3GPP Draft; R1-1610178_UL Control Channels Overview, 3rd Generation Partnership Project (3GPP), Mobile Competence Centre, 650, Route Des Lucioles; F-06921, Sophia-Antipolis Cedex; France, vol. RAN WG1, No. Lisbon, Portugal; Oct. 10, 2016-Oct. 14, 2016, Oct. 1, 2016 (Oct. 1, 2016), pp. 1-3, XP051159978, Retrieved from the Internet: URL: http://www.3gpp.org/ftp/tsg_ran/WG1_RL1/TSGR1_86b/Docs/ [retrieved on Oct. 1, 2016].

Qualcomm Incorporated: "UCI Content", 3GPP Draft; R1-1610179_UCI Content, 3rd Generation Partnership Project (3GPP), Mobile Competence Centre; 650, Route Des Lucioles; F-06921 Sophia-Antipolis Cedex; France, vol. RAN WG1, No. Lisbon, Portugal; Oct. 10, 2016-Oct. 14, 2016, Oct. 9, 2016 (Oct. 9, 2016), pp. 1-2, XP051150199, Retrieved from the Internet: URL: http://www.3gpp.org/ftp/Meetings_3GPP SYNC/RAN1/Docs/ [retrieved on Oct. 9, 2016].

Qualcomm Incorporated: "Summary of Email Discussion on Frame Structure", 3GPP Draft R1-165456_Frame_Structure_Discussion, 3rd Generation Partnership Project (3GPP), Mobile Competence Centre; 650, Route Des Lucioles; F-06921 Sophia-Antipolis Cedex; France, vol. RAN WG1, No. Nanjing, China; May 23, 2016-May 27, 2016, May 24, 2016 (May 24, 2016), pp. 1-28, XP051104210, Retrieved from the Internet: URL: http://www.3gpp.org/ftp/Meetings_3GPP SYNC/RAN1/Docs/ [retrieved on May 24, 2016].

ZTE: "TPC and PHR for UL LAA", 3GPP TSG RAN WG1 Meeting #85, 3GPP Draft; R1-164576—TPC and PHR for UL LAA, 3rd Generation Partnership Project (3GPP), Mobile Competence Centre; 650, Route Des Lucioles; F-06921 Sophia-Antipolis Cedex; France, vol. RAN WG1, No. Nanjing, China; May 23, 2016-May 27, 2016, May 13, 2016 (May 13, 2016), pp. 1-5, XP051096893, Retrieved from the Internet: URL: http://www.3gpp.org/ftp/tsg_ran/WG1_RL1/TSGR1_85/Docs/ [retrieved on May 13, 2016] p. 4, Section 4, Paragraph 2.

LG Electronics: "Discussion on sPUSCH Design with TTI Shortening", 3GPP TSG-RAN WG1#85, 3GPP Draft; R1-164544, 3rd Generation Partnership Project (3GPP), Mobile Competence Centre, 650, Route Des Lucioles, F-06921 Sophia-Antipolis Cedex, France, vol. RAN WG1, No. Nanjing, China; May 23, 2016-May 27, 2016,May 14, 2016, XP051096392, Retrieved from the Internet: URL: http://www.3gpp.org/ftp/tsg_ran/WG1_RL1/TSGR1_660/Docs/R1-164544.zip [retrieved on May 14, 2016], 4 pages.

NTT Docomo, Inc: "Discussion on Frame Structure for NR", 3GPP TSG RAN WG1 Meeting #85, R1-165176, Nanjing, P. R. China May 23-27, 2016, pp. 1-10.

Qualcomm Incorporated: "CSI Feedback Schemes", 3GPP Draft, R1-166382, 3rd Generation Partnership Project (3gpp), Mobile Competence Centre, 650, Route Des Lucioles, F-06921 Sophia-Antipolis Cedex, France, vol. RAN WG1, No. Gothenburg, Sweden, Aug. 22, 2016-Aug. 26, 2016, Aug. 13, 2016 (Aug. 13, 2016), XP051142365, 5 pages Retrieved from the Internet: URL: http://www.3gpp.org/ftp/tsg_ran/WG1_RL1/TSGR1 86/Docs/.

Samsung: "Discussion on TTI, Subframe and Signalling Timing for NR", 3GPP TSG RAN WG1 #85, R1-164004, Nanjing, China, May 23-27, 2016, 5 Pages.

\* cited by examiner

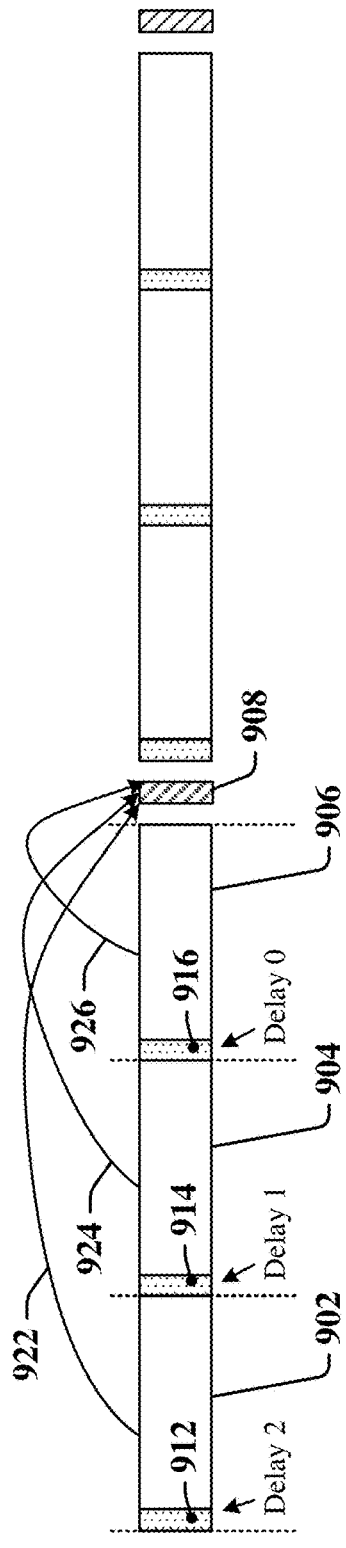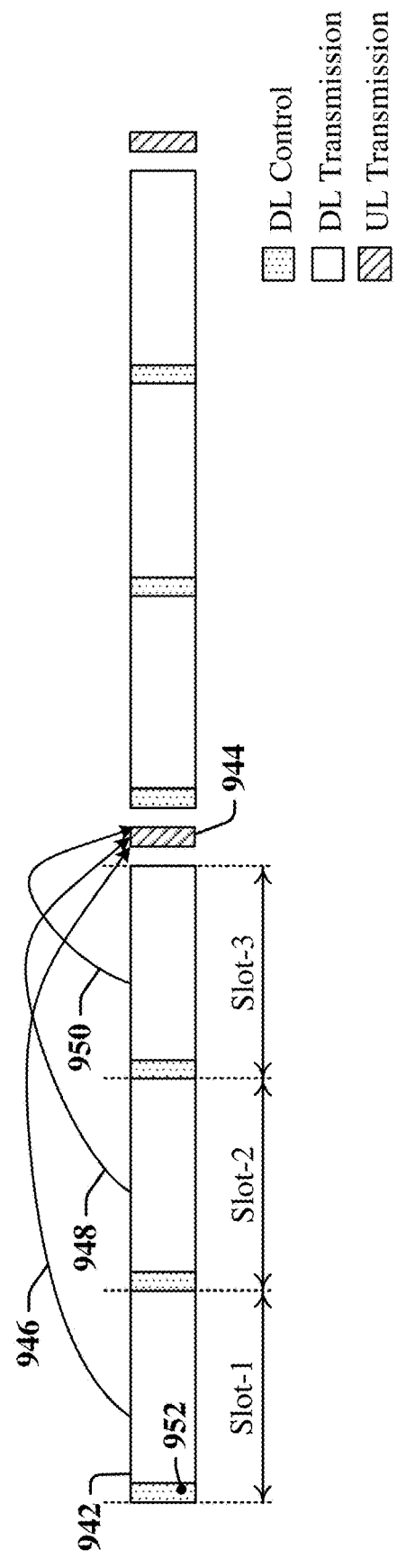
FIG. 9

US 11,490,408 B2

NETWORK CONFIGURED UPLINK CONTROL FEEDBACK FOR 5G NEW RADIO (NR)

PRIORITY CLAIM

This application is a continuation application of U.S. patent application Ser. No. 15/934,801 filed in the U.S. Patent Office on Mar. 23, 2018, which is a continuation application of U.S. patent application Ser. No. 15/710,771 filed in the U.S. Patent Office on Sep. 20, 2017, which issued as U.S. Pat. No. 10,091,810 on Oct. 2, 2018 and which claims priority to and the benefit of U.S. Provisional Patent Application Ser. No. 62/417,789 filed in the U.S. Patent Office on Nov. 4, 2016, the entire content of these applications being incorporated herein by reference as if fully set forth below in its entirety and for all applicable purposes.

TECHNICAL FIELD

The technology discussed below relates generally to wireless communication systems, and more particularly, to reconfigurable uplink control transmissions for wireless communication and communication methods.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems.

Multiple access technologies have been adopted in various telecommunication standards to provide a common protocol that enables different wireless devices to communicate on a municipal, national, regional, and even global level. For example, fifth generation (5G) New Radio (NR) communications technology is envisaged to expand and support diverse usage scenarios and applications with respect to current mobile network generations. In an aspect, 5G communications technology includes enhanced mobile broadband addressing human-centric use cases for access to multimedia content, services and data; ultra-reliable-low latency communications (URLLC) with strict requirements, especially in terms of latency and reliability; and massive machine type communications for a very large number of connected devices and typically transmitting a relatively low volume of non-delay-sensitive information.

Wireless communication networks are being utilized to provide and support an even broader range of services for various types of devices with different capabilities. While some devices can fully utilize the available bandwidth of the communication channels, some devices have limited or lesser ability to utilize the full bandwidth and/or need to conserve power to extend operating time, especially for battery powered devices. However, in current communication standards such as Long-Term Evolution (LTE), certain aspects of the downlink slot structure may limit the extent of power saving and spectral efficiency, especially if extended to a wider bandwidth implementation of the next generation networks or 5G networks.

As the demand for mobile broadband access continues to increase, however, there exists a need for further improvements in 5G communications technology and beyond. Preferably, these improvements should be applicable to other multi-access technologies and the telecommunication standards that employ these technologies.

BRIEF SUMMARY OF SOME EXAMPLES

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

Some aspects of the disclosure relate to a method of wireless communication operable at a scheduling entity that may include transmitting scheduling information operative to schedule transmission of uplink control information by a scheduled entity; transmitting a long downlink burst in each of two or more slots that provide for a short uplink control burst; and transmitting a short downlink control burst in at least one slot that provide for a long uplink burst, where the scheduling information is configured to cause the scheduled entity to select between a short uplink control burst and a long uplink burst for transmission of the uplink control information.

Some aspects of the disclosure relate to a scheduling entity configured for wireless communication, that may include a communication interface configured to communicate wirelessly with one or more scheduled entities; a memory comprising executable code; and a processor coupled to the communication interface and the memory. The processor may be configured by the executable code to transmit scheduling information operative to schedule transmission of uplink control information by a scheduled entity; transmit a long downlink burst in each of two or more slots that provide for a short uplink control burst; and transmit a short downlink control burst in at least one slot that provide for a long uplink burst, where the scheduling information is configured to cause the scheduled entity to select between a short uplink control burst and a long uplink burst for transmission of the uplink control information.

Some aspects of the disclosure relate to a computer-readable storage medium that stores executable code for causing a scheduling entity to transmit scheduling information to a scheduled entity to transmit scheduling information operative to schedule transmission of uplink control information by a scheduled entity; transmit a long downlink burst in each of two or more slots that provide for a short uplink control burst; and transmit a short downlink control burst in at least one slot that provide for a long uplink burst, where the scheduling information is configured to cause the scheduled entity to select between a short uplink control burst and a long uplink burst for transmission of the uplink control information.

Some aspects of the disclosure relate to an apparatus adapted to communicate as a scheduling entity in a wireless network, and that may include means for generating scheduling information to be transmitted to a scheduled entity, the scheduling information including information that schedules transmission of uplink control information by the scheduled entity; and means for transmitting information in a plurality of slots, the plurality of slots including two or more slots configured for a long downlink burst and a short uplink control burst, and at least one slot configured for a short downlink control burst and a long uplink burst, where the scheduling information is configured to cause the scheduled entity to select between a short uplink control burst and a long uplink burst for transmission of the uplink control information.

BRIEF DESCRIPTION OF THE DRAWINGS

FIG. 9 is a diagram illustrating examples of UL feedback scheduling based on UL control burst availability according to one aspect of the disclosure.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Aspects of the present disclosure provide for flexible and reconfigurable UL control feedback that may be utilized in the next generation or 5G wireless communication networks, including networks that implement 5G NR communications technology. Feedback related to DL transmissions may be provided in short UL bursts within the slots carrying the DL transmissions. In some instances, processing capabilities, power headroom and other operational conditions may cause a base station to schedule transmission of feedback associated with a first slot in a second slot. In some instances, network loading or interference associated with certain types of UL bursts may cause the feedback to be transmitted in other UL bursts.

Figure 1:
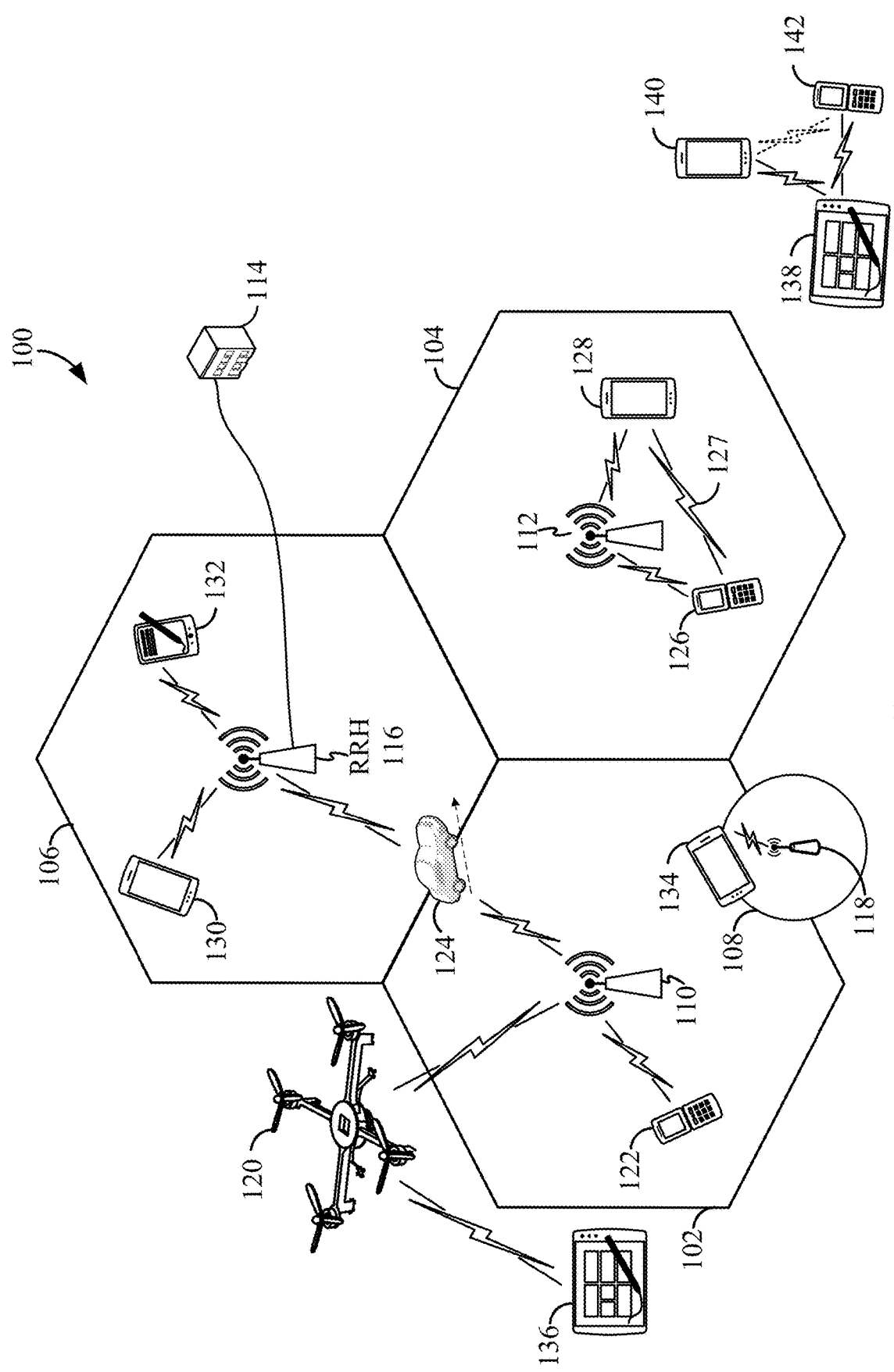
FIG. 1 is a diagram illustrating an example of an access network.

The various concepts presented throughout this disclosure may be implemented across a broad variety of telecommunication systems, network architectures, and communication standards. Referring now to FIG. 1, as an illustrative example without limitation, a schematic illustration of a radio access network 100 is provided.

The geographic region covered by the radio access network 100 may be divided into a number of cellular regions (cells) that can be uniquely identified by a user equipment (UE) based on an identification broadcasted over a geographical area from one access point or base station. FIG. 1 illustrates macrocells 102, 104, and 106, and a small cell 108, each of which may include one or more sectors. A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

In general, a base station (BS) serves each cell. Broadly, a base station is a network element in a radio access network responsible for radio transmission and reception in one or more cells to or from a UE. A BS may also be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), or some other suitable terminology.

In FIG. 1, two high-power base stations 110 and 112 are shown in cells 102 and 104; and a third high-power base station 114 is shown controlling a remote radio head (RRH) 116 in cell 106. That is, a base station can have an integrated antenna or can be connected to an antenna or RRH by feeder cables. In the illustrated example, the cells 102, 104, and 106 may be referred to as macrocells, as the high-power base stations 110, 112, and 114 support cells having a large size. Further, a low-power base station 118 is shown in the small cell 108 (e.g., a microcell, picocell, femtocell, home base station, home Node B, home eNode B, etc.) which may overlap with one or more macrocells. In this example, the cell 108 may be referred to as a small cell, as the low-power base station 118 supports a cell having a relatively small size. Cell sizing can be done according to system design as well as component constraints. It is to be understood that the radio access network 100 may include any number of wireless base stations and cells. Further, a relay node may be deployed to extend the size or coverage area of a given cell. The base stations 110, 112, 114, 118 provide wireless access points to a core network for any number of mobile apparatuses.

FIG. 1 further includes a quadcopter or drone 120, which may be configured to function as a base station. That is, in some examples, a cell may not necessarily be stationary, and the geographic area of the cell may move according to the location of a mobile base station such as the quadcopter 120.

In general, base stations may include a backhaul interface for communication with a backhaul portion of the network. The backhaul may provide a link between a base station and a core network, and in some examples, the backhaul may provide interconnection between the respective base stations. The core network is a part of a wireless communication system that is generally independent of the radio access technology used in the radio access network. Various types of backhaul interfaces may be employed, such as a direct physical connection, a virtual network, or the like using any suitable transport network. Some base stations may be configured as integrated access and backhaul (IAB) nodes, where the wireless spectrum may be used both for access links (i.e., wireless links with UEs), and for backhaul links. This scheme is sometimes referred to as wireless self-backhauling. By using wireless self-backhauling, rather than requiring each new base station deployment to be outfitted with its own hard-wired backhaul connection, the wireless spectrum utilized for communication between the base station and UE may be leveraged for backhaul communication, enabling fast and easy deployment of highly dense small cell networks.

The radio access network 100 is illustrated supporting wireless communication for multiple mobile apparatuses. A mobile apparatus is commonly referred to as user equipment (UE) in standards and specifications promulgated by the 3rd Generation Partnership Project (3GPP), but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus that provides a user with access to network services.

Within the present document, a "mobile" apparatus need not necessarily have a capability to move, and may be stationary. The term mobile apparatus or mobile device broadly refers to a diverse array of devices and technologies. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A mobile apparatus may additionally be an automotive or other transportation vehicle, a remote sensor or actuator, a robot or robotics device, a satellite radio, a global positioning system (GPS) device, an object tracking device, a drone, a multi-copter, a quadcopter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc.; an industrial automation and enterprise device; a logistics controller; agricultural equipment; military defense equipment, vehicles, aircraft, ships, and weaponry, etc. Still further, a mobile apparatus may provide for connected medicine or telemedicine support, i.e., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Within the radio access network 100, the cells may include UEs that may be in communication with one or more sectors of each cell. For example, UEs 122 and 124 may be in communication with base station 110; UEs 126 and 128 may be in communication with base station 112; UEs 130 and 132 may be in communication with base station 114 by way of RRH 116; UE 134 may be in communication with low-power base station 118; and UE 136 may be in communication with mobile base station 120. Here, each base station 110, 112, 114, 118, and 120 may be configured to provide an access point to a core network (not shown) for all the UEs in the respective cells. Transmissions from a base station (e.g., base station 110) to one or more UEs (e.g., UEs 122 and 124) may be referred to as downlink (DL) transmission, while transmissions from a UE (e.g., UE 122) to a base station may be referred to as uplink (UL) transmissions. In accordance with certain aspects of the present disclosure, the term downlink may refer to a point-to-multipoint transmission originating at a scheduling entity 202. Another way to describe this scheme may be to use the term broadcast channel multiplexing. In accordance with further aspects of the present disclosure, the term uplink may refer to a point-to-point transmission originating at a scheduled entity 204.

In some examples, a mobile network node (e.g., quadcopter 120) may be configured to function as a UE. For example, the quadcopter 120 may operate within cell 102 by communicating with base station 110. In some aspects of the disclosure, two or more UE (e.g., UEs 126 and 128) may communicate with each other using peer to peer (P2P) or sidelink signals 127 without relaying that communication through a base station (e.g., base station 112).

In the radio access network 100, the ability for a UE to communicate while moving, independent of its location, is referred to as mobility. The various physical channels between the UE and the radio access network are generally set up, maintained, and released under the control of a mobility management entity (MME). In various aspects of the disclosure, a radio access network 100 may utilize DL-based mobility or UL-based mobility to enable mobility and handovers (i.e., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 124 (illustrated as a vehicle, although any suitable form of UE may be used) may move from the geographic area corresponding to its serving cell 102 to the geographic area corresponding to a neighbor cell 106. When the signal strength or quality from the neighbor cell 106 exceeds that of its serving cell 102 for a given amount of time, the UE 124 may transmit a reporting message to its serving base station 110 indicating this condition. In response, the UE 124 may receive a handover command, and the UE may undergo a handover to the cell 106.

In a network configured for UL-based mobility, UL reference signals from each UE may be utilized by the network to select a serving cell for each UE. In some examples, the base stations 110, 112, and 114/116 may broadcast unified synchronization signals (e.g., unified Primary Synchronization Signals (PSSs), unified Secondary Synchronization Signals (SSSs) and unified Physical Broadcast Channels (PBCH)). The UEs 122, 124, 126, 128, 130, and 132 may receive the unified synchronization signals, derive the carrier frequency and slot timing from the synchronization signals, and in response to deriving timing, transmit an uplink pilot or reference signal. The uplink pilot signal transmitted by a UE (e.g., UE 124) may be concurrently received by two or more cells (e.g., base stations 110 and 114/116) within the radio access network 100. Each of the cells may measure a strength of the pilot signal, and the radio access network (e.g., one or more of the base stations 110 and 114/116 and/or a central node within the core network) may determine a serving cell for the UE 124. As the UE 124 moves through the radio access network 100, the network may continue to monitor the uplink pilot signal transmitted by the UE 124. When the signal strength or quality of the pilot signal measured by a neighboring cell exceeds that of the signal strength or quality measured by the serving cell, the network 100 may handover the UE 124 from the serving cell to the neighboring cell, with or without informing the UE 124.

Although the synchronization signal transmitted by the base stations 110, 112, and 114/116 may be unified, the synchronization signal may not identify a particular cell, but rather may identify a zone of multiple cells operating on the same frequency and/or with the same timing. The use of zones in 5G networks or other next generation communication networks enables the uplink-based mobility framework and improves the efficiency of both the UE and the network, since the number of mobility messages that need to be exchanged between the UE and the network may be reduced.

In various implementations, the air interface in the radio access network 100 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

In some examples, access to the air interface may be scheduled, wherein a scheduling entity (e.g., a base station) allocates resources for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs or scheduled entities utilize resources allocated by the scheduling entity.

Base stations are not the only entities that may function as a scheduling entity. That is, in some examples, a UE may function as a scheduling entity, scheduling resources for one or more scheduled entities (e.g., one or more other UEs). In other examples, sidelink signals may be used between UEs without necessarily relying on scheduling or control information from a base station. For example, UE 138 is illustrated communicating with UEs 140 and 142. In some examples, the UE 138 is functioning as a scheduling entity or a primary sidelink device, and UEs 140 and 142 may function as a scheduled entity or a non-primary (e.g., secondary) sidelink device. In still another example, a UE may function as a scheduling entity in a device-to-device (D2D), P2P, or vehicle-to-vehicle (V2V) network, and/or in a mesh network. In a mesh network example, UEs 140 and 142 may optionally communicate directly with one another in addition to communicating with the UE 138.

Figure 2:
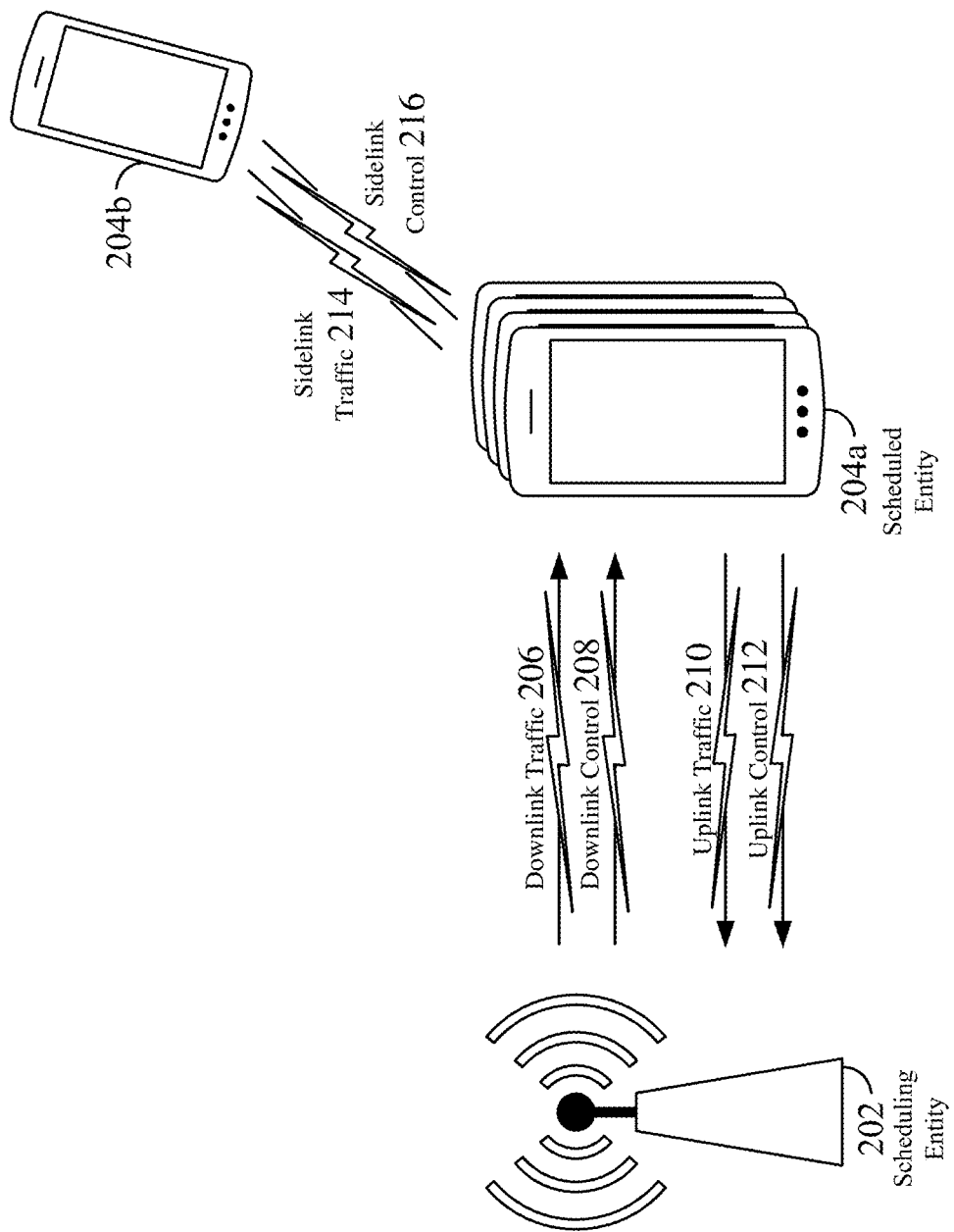
FIG. 2 is a block diagram conceptually illustrating an example of a scheduling entity communicating with one or more scheduled entities according to some aspects of the disclosure.

Thus, in a wireless communication network with scheduled access to time-frequency resources and having a cellular configuration, a P2P configuration, or a mesh configuration, a scheduling entity and one or more scheduled entities may communicate utilizing the scheduled resources. Referring now to FIG. 2, a block diagram 200 illustrates a scheduling entity 202 and a plurality of scheduled entities 204 (e.g., 204*a* and 204*b*). Here, the scheduling entity 202 may correspond to a base station 110, 112, 114, and/or 118. In additional examples, the scheduling entity 202 may correspond to a UE 138, the quadcopter 120, or any other suitable node in the radio access network 100. Similarly, in various examples, the scheduled entity 204 may correspond to the UE 122, 124, 126, 128, 130, 132, 134, 136, 138, 140, and 142, or any other suitable node in the radio access network 100.

As illustrated in FIG. 2, the scheduling entity 202 may transmit or broadcast traffic 206 and/or control 208 to one or more scheduled entities 204 (the traffic may be referred to as downlink traffic). Broadly, the scheduling entity 202 is a node or device responsible for scheduling traffic in a wireless communication network, including the downlink transmissions and, in some examples, uplink traffic 210 and/or uplink control 212 from one or more scheduled entities to the scheduling entity 202. Broadly, the scheduled entity 204 is a node or device that receives control information, including but not limited to scheduling information (e.g., a grant), synchronization or timing information, or other control information from another entity in the wireless communication network such as the scheduling entity 202.

In some examples, scheduled entities such as a first scheduled entity 204*a* and a second scheduled entity 204*b* may utilize sidelink signals for direct D2D communication. Sidelink signals may include sidelink traffic 214 and sidelink control 216. Sidelink control information 216 may in some examples include a request signal, such as a request-to-send (RTS), a source transmit signal (STS), and/or a direction selection signal (DSS). The request signal may provide for a scheduled entity 204 to request a duration of time to keep a sidelink channel available for a sidelink signal. Sidelink control information 216 may further include a response signal, such as a clear-to-send (CTS) and/or a destination receive signal (DRS). The response signal may provide for the scheduled entity 204 to indicate the availability of the sidelink channel, e.g., for a requested duration of time. An exchange of request and response signals (e.g., handshake) may enable different scheduled entities performing sidelink communications to negotiate the availability of the sidelink channel prior to communication of the sidelink traffic information 214.

The air interface in the radio access network 100 may utilize one or more duplexing algorithms. Duplex refers to a point-to-point communication link where both endpoints can communicate with one another in both directions. Full duplex means both endpoints can simultaneously communicate with one another. Half duplex means only one endpoint can send information to the other at a time. In a wireless link, a full duplex channel generally relies on physical isolation of a transmitter and receiver, and suitable interference cancellation technologies. Full duplex emulation is frequently implemented for wireless links by utilizing frequency division duplex (FDD) or time division duplex (TDD). In FDD, transmissions in different directions operate at different carrier frequencies. In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot.

Transmissions over the radio access network 100 may generally utilize a suitable error correcting block code. In a typical block code, an information message or sequence is split up into code blocks (CBs), and an encoder (e.g., a CODEC) at the transmitting device then mathematically adds redundancy to the information message. Exploitation of this redundancy in the encoded information message can improve the reliability of the message, enabling correction for any bit errors that may occur due to the noise. Some examples of error correcting codes include Hamming codes, Bose-Chaudhuri-Hocquenghem (BCH) codes, Turbo codes, low-density parity check (LDPC) codes, and Polar codes. Various implementations of scheduling entities 202 and scheduled entities 204 may include suitable hardware and capabilities (e.g., an encoder, a decoder, and/or a CODEC) to utilize any one or more of these error correcting codes for wireless communication.

The air interface in the radio access network 100 may utilize one or more multiplexing and multiple access algorithms to enable simultaneous communication of the various devices. For example, multiple access for uplink (UL) or reverse link transmissions from UEs 122 and 124 to base station 110 may be provided utilizing time division multiple access (TDMA), code division multiple access (CDMA), frequency division multiple access (FDMA), orthogonal frequency division multiple access (OFDMA), discrete Fourier transform (DFT)-spread OFDMA or single-carrier FDMA (DFT-s-OFDMA or SC-FDMA), sparse code multiple access (SCMA), resource spread multiple access (RSMA), or other suitable multiple access schemes. Further, multiplexing downlink (DL) or forward link transmissions from the base station 110 to UEs 122 and 124 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

Figure 3:
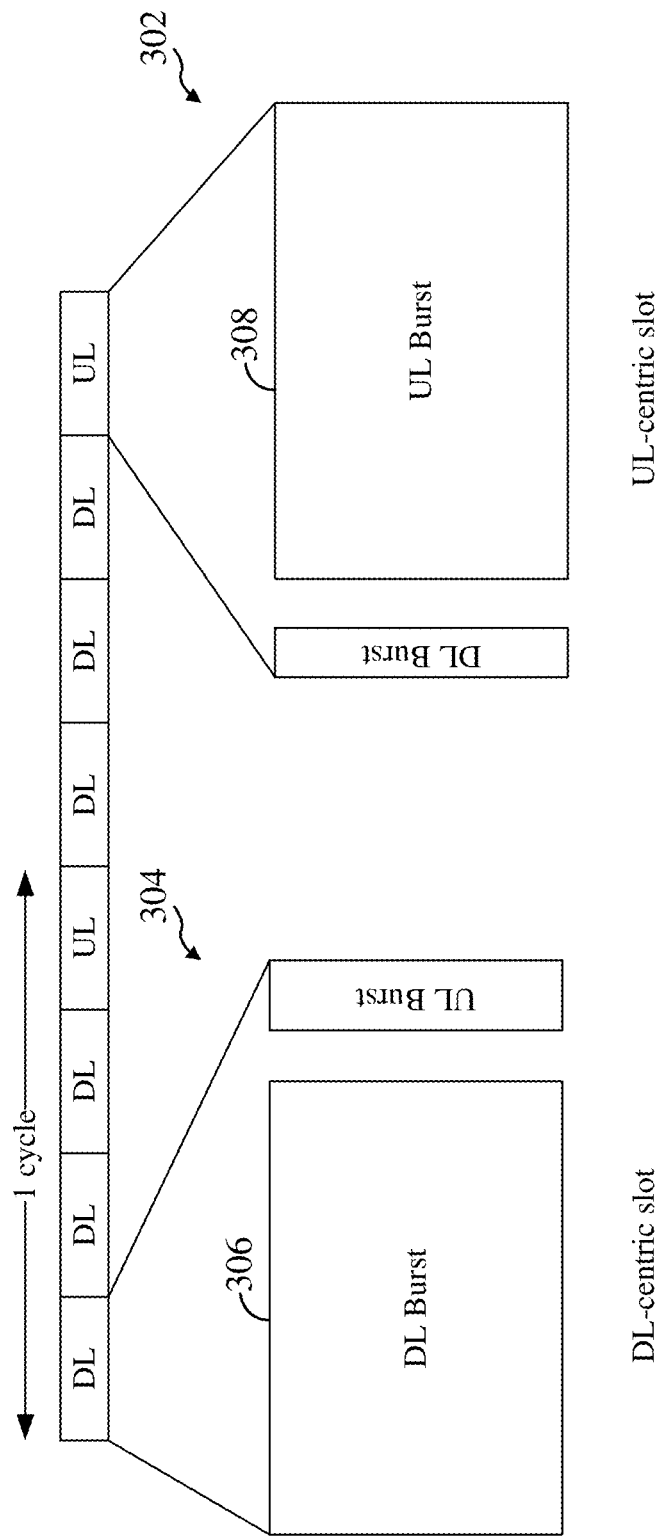
FIG. 3 illustrates an uplink-centric slot structure and a downlink-centric slot structure that may be employed in certain access networks that may be adapted in accordance with some aspects of the disclosure.

FIG. 3 illustrates example of slots in an access network that utilizes a TDD carrier. Communication may be organized by dividing the channel in the time domain into frames, with the frames being further divided into slots. According to an aspect of the present disclosure, slots may take at least two general forms, referred to herein as an UL-centric slot structure 302 and a DL-centric slot structure 304. Here, a DL-centric slot is a slot where a majority of its scheduled time is used for communication in the downlink direction (e.g., shown as a DL burst 306 in FIG. 3); and an UL-centric slot is a slot where a majority of its scheduled time is used for communication in the uplink direction (e.g., shown as an UL burst 308 in FIG. 3).

In a typical cell deployment, there may be an asymmetry between downlink traffic and uplink traffic. In general, a network may communicate a greater amount of downlink traffic, and accordingly, a greater number of DL-centric slots may be scheduled. Furthermore, even while this imbalance may be predictable, the actual ratio between UL-centric slots and DL-centric slots may not be predictable, and may vary over time. In the example illustrated in FIG. 3, the ratio is three DL-centric slots to one UL-centric slot for a certain cycle. It will be appreciated that the ratio of DL-centric slots to UL-centric slot may be selected for each application and/or based on network requirements or conditions and that a wide variety of ratios can be implemented.

This combination of an imbalance, and unpredictability of its exact measure, can cause issues in conventional TDD frame/slot structures. Specifically, if a UE or scheduled entity has data that it wishes to transmit over the uplink, the UE must wait for an uplink transmission opportunity. With this slot structure, the time when such an uplink transmission opportunity may occur can vary, and can be unpredictable. In many cases, the time may be quite long, resulting in significant latency. This latency can be particularly problematic when the information that the UE wishes to transmit over the uplink is control feedback, which can be time-sensitive or mission-critical in many cases.

The unpredictable latency associated with asymmetric traffic can be at least partially alleviated by utilizing a slot structure that presents reasonable uplink transmission opportunities in every slot. Accordingly, in some aspects of the present disclosure, TDD slots may be structured as self-contained slots.

Figure 4:
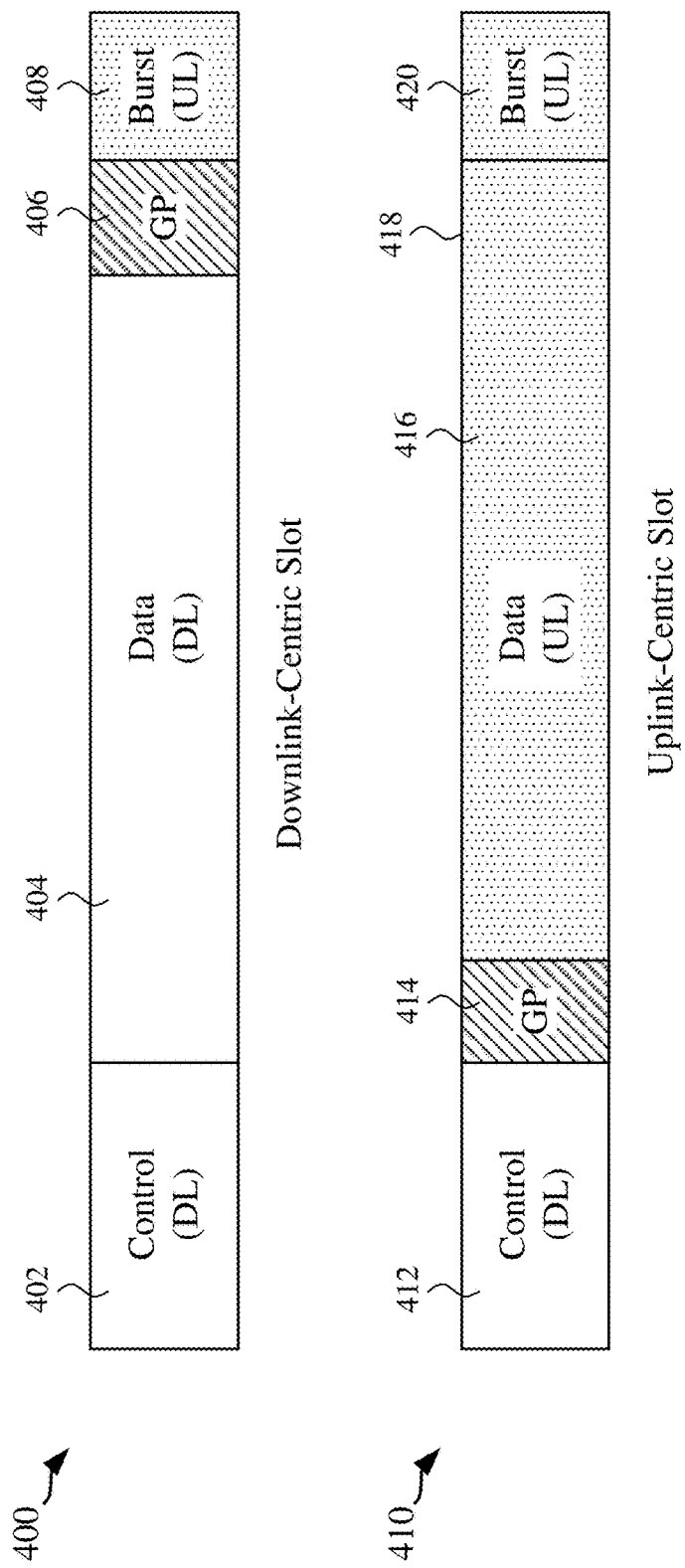
FIG. 4 illustrates self-contained slots that may be employed and/or adapted in accordance with certain aspects of the disclosure.

FIG. 4 illustrates exemplary structures of self-contained slots 400 and 410. Broadly, a self-contained slot is one in which the scheduling, the data transmission, and the data acknowledgment (feedback) are grouped together into a single self-contained unit or slot, and which may be independent of other slots. In the example of the DL-centric slot 400, all of the data in the DL data portion 404 may be scheduled utilizing scheduling information or grants in the DL control region 402 and further, all of the data in the data portion 404 may be acknowledged (or negatively acknowledged) in the ACK portion 408 (UL control). Similarly, for the uplink-centric slot 410, all of the data in the data portion 416 may be scheduled utilizing scheduling information or grants in the DL control region 412.

In the context of a multiple access network, channel resources are generally scheduled, and each entity is synchronous in time. That is, each node utilizing the network coordinates its usage of the resources such that transmissions are only made during the allocated portion of the frame, and the time of each allocated portion is synchronized among the different nodes or network devices. One node acts as a scheduling entity, and one or more nodes may be scheduled entities. The scheduling entity may be a base station or access point, or a UE in a D2D, P2P, and/or mesh network. The scheduling entity manages the resources on the carrier and assigns resources to other users of the channel or carrier, including scheduled entities, such as one or more UEs in a cellular network.

Each slot 400, 410 is divided into transmit (Tx) and receive (Rx) portions. In the DL-centric slot 400, the scheduling entity first has an opportunity to transmit control information in the DL control region 402, and then an opportunity to transmit data in the DL data portion 404. The Tx portions 402 and 404 carry DL bursts in this case. Following a guard period (GP) portion 406, the scheduling entity has an opportunity to receive an acknowledged (ACK)/not acknowledged (NACK) signal or feedback in the ACK/NACK portion 408 from other entities using the carrier. The ACK/NACK portion 408 carries an UL burst. This frame structure is downlink-centric, as more resources are allocated for transmissions in the downlink direction (e.g., transmissions from the scheduling entity).

In one example, the DL control region 402 may be used to transmit a physical downlink control channel (PDCCH), and the DL data portion 404 may be used to transmit a DL data payload or user data. Following the GP portion 406, the scheduling entity may receive an ACK signal (or a NACK signal) from the scheduled entity during the ACK/NACK portion 408 to indicate whether the data payload was successfully received. The GP portion 406 may be scheduled to accommodate variability in UL and DL timing. For example, latencies due to RF antenna and/or circuitry direction switching (e.g., from DL to UL) and transmission path latencies may cause the scheduled entity to transmit early on the UL to match DL timing. Such early transmission may interfere with symbols received from the scheduling entity. Accordingly, the GP portion 406 may allow an amount of time after the DL data portion 404 to prevent or reduce interference, where the GP portion 406 may provide an appropriate amount of time for the scheduling entity to switch its RF antenna/circuitry direction, for the over-the-air (OTA) transmission time, and time for ACK processing by the scheduled entity. Accordingly, the GP portion 406 may provide an appropriate amount of time for the scheduled entity to switch its RF antenna/circuitry direction (e.g., from DL to UL), to process the data payload, and for the over-the-air (OTA) transmission time. The duration of the GP portion 406 may be configured in terms of symbol periods. For example, the GP portion 406 may have a duration of one symbol period or multiple symbol periods. This frame structure is downlink-centric, as more resources are allocated for transmissions in the downlink direction (e.g., transmissions from the scheduling entity).

In the UL-centric slot 410, the scheduled entity first has an opportunity to receive control information in the DL control region 412. Following a GP portion 414, an UL transmission period 418 may be scheduled, including an UL data portion 416 and/or an UL burst 420. The scheduled entity has an opportunity to transmit data in the UL data portion 416. The scheduled entity subsequently may have an opportunity to transmit an ACK/NACK signal in the UL burst 420. This frame structure is uplink-centric, as more resources are allocated for transmissions in the uplink direction (e.g., transmissions from the scheduled entity). In some aspects of the disclosure, the GP portion may be optional.

In some aspects of the present disclosure, certain control information may be pulled or grouped into its own physical channel. In one example, control information carried within the DL control information (DCI) in an LTE network or the like may be pulled or grouped into the physical downlink retransmission indicator channel (PDRICH). The PDRICH may include a subset of information carried in a control subband or control region of a slot. For example, if the DCI in a slot is broken up such that resource allocation may be provided first in a slot, and later in the slot, retransmission indicators (RI) may be provided in the PDRICH, then the scheduling entity has additional time to determine whether to perform a retransmission. By virtue of a suitable slot structure, including the location of the PDRICH, single-interlace transmissions may be enabled.

Figure 5:
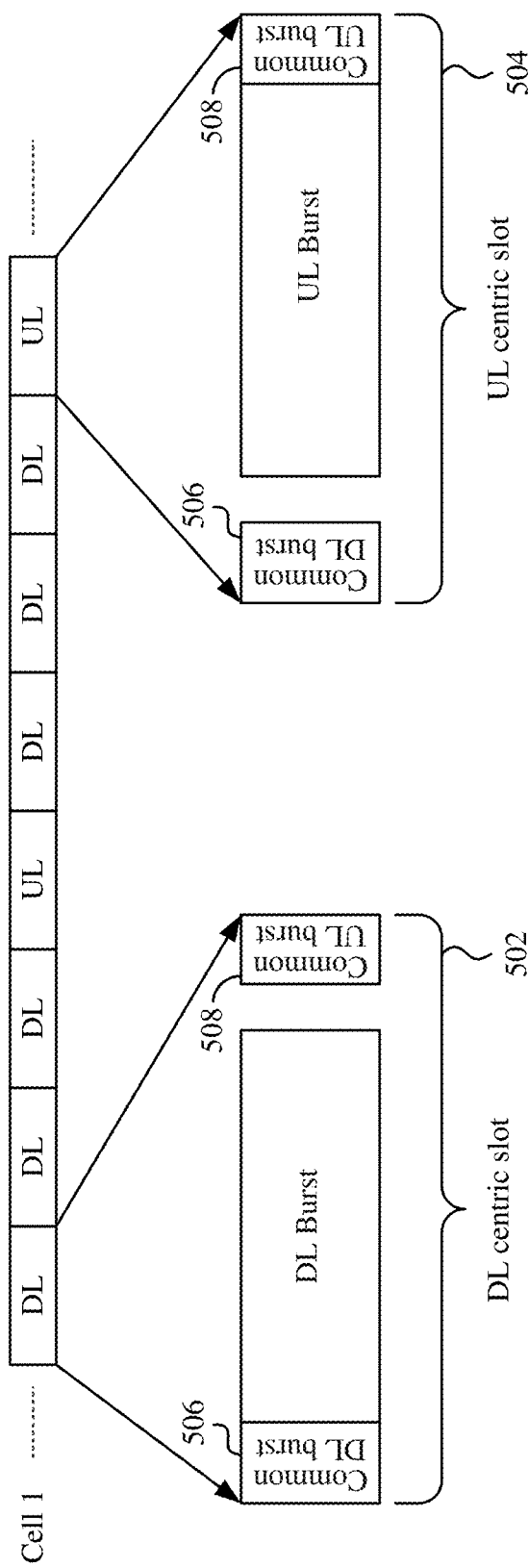
FIG. 5 illustrates a common downlink (DL) burst and a common uplink (UL) burst as they may appear in each of a DL-centric slot and an UL-centric slot according to some aspects of the disclosure.

FIG. 5 is a diagram illustrating some examples of common DL bursts and common UL bursts as they may appear in each of a DL-centric slot 502 and an UL-centric slot 504. In the illustrated examples, the common DL bursts 506 occur at the beginning of each slot, and the common UL bursts 508 occur at the end of each slot. However, this is not necessarily the case, and within the scope of the present disclosure, such common UL burst and common DL burst may appear anywhere within each respective slot. For example, some networking technologies a slot includes two or more slots, and common UL bursts and common DL bursts may be provided in each slot.

In some aspects of the disclosure, all common DL bursts 506 within any given slot (whether an UL-centric slot or a DL-centric slot) may have the same structure, and/or all common UL bursts 508 within any given slot (whether an UL-centric slot or a DL-centric slot) may have the same structure. While these common bursts may carry any suitable information, in some examples the common DL burst may be utilized to carry control information transmitted by the scheduling entity, including but not limited to scheduling information for either the UL or DL (or both); or, in multi-interlace or non-self-contained slots, physical layer acknowledgment (ACK) transmissions. For example, the common DL bursts 506 may include the DL control regions 402 and 412 of FIG. 4. Further, the common UL burst may be utilized to carry UL control information transmitted by the UE or scheduled entity, including but not limited to a sounding reference signal (SRS), a physical layer ACK or NACK, a scheduling request (SR), channel quality information (CQI), etc.

As with the self-contained slots described above, by utilizing these common UL and DL bursts, latency may be reduced for mission-critical packets such as control information and feedback, to the duration of, for example, a single slot. However, according to various aspects of the present disclosure, the possibility for this latency or delay to be controlled allows different delays or latencies to be provided. That is, by virtue of the presence of the common DL burst 506 and common UL burst 508 in every slot, the scheduled entity and scheduling entity may be enabled to send the control information carried on these common bursts with a configurable delay, which may be independent of the UL/DL ratio, or the nature of the particular slot currently occupying the channel (either DL-centric or UL-centric). Furthermore, in further aspects of the disclosure, UEs or scheduled entities with different delays may be multiplexed onto the channel, and may share these resources while still maintaining control over their respective delays.

Figure 6:
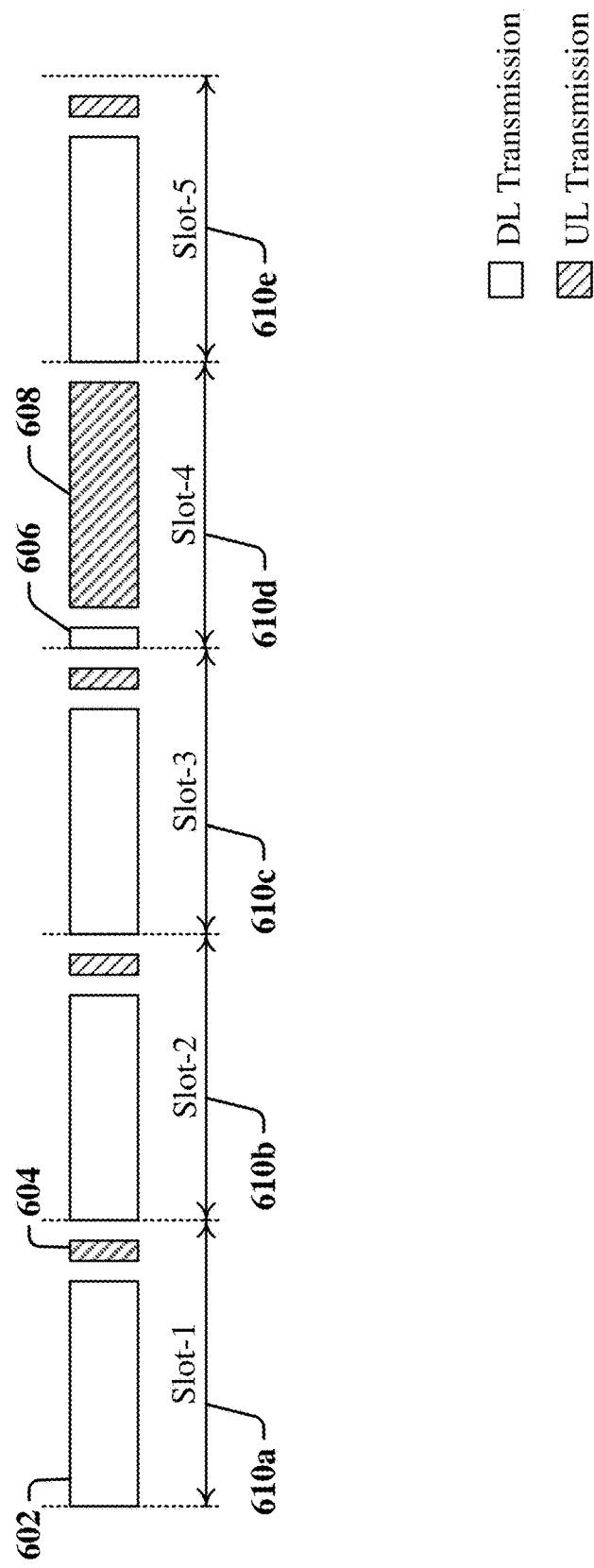
FIG. 6 illustrates a transmission in which a plurality of slots includes DL-centric slots and an UL-centric slot according to one aspect of the disclosure.

In some examples, the common DL bursts and common UL bursts in each of a DL-centric slot 502 and an UL-centric slot 504 (see FIG. 5) may be used to support at least two types of 5G NR UL control channel transmission. FIG. 6 illustrates a transmission 600 in which a plurality of slots 610a-610e include DL-centric slots 610a, 610b, 610c, 610e and an UL-centric slot 610d. The plurality of slots 610a-610e may span two or more slots. The illustrated plurality of slots 610a-610e may be transmitted repeatedly and/or may be part of a larger pattern or arrangement of slots. In one example, a DL-centric slot 610a includes one or more DL bursts 602 and a short-duration UL burst 604. In another example, an UL-centric slot 610d includes a short DL burst 606 and a long-duration UL burst 608. 5G NR UL control channel transmissions may be supported by the short-duration UL burst 604 transmitted in a DL-centric slot 610a, and/or in a long-duration UL burst 608 in the UL-centric slot 610d.

In many examples, some or all of a UL control channel can be transmitted in a short-duration UL burst 604. In some instances, the UL control channel may be transmitted in the last UL symbol or symbols of a slot 610a, 610b, 610c, 610e. The UL control channel can also be transmitted in a long-duration UL burst 608 over multiple UL symbols to improve coverage and/or to provide increased energy at the decoder. In general, short-duration UL bursts 604 are likely to be configured more often than the long-duration UL bursts 608, and the use of short-duration UL bursts 604 for UL control channel transmission can provide faster feedback to a base station or other scheduling entity. In some instances, the use of long-duration UL bursts 608 for UL control channel transmission can provide longer transmission times, which may be important for transmitting larger volumes of feedback information, and/or to accommodate link budget limitations that can affect a UE.

According to certain aspects disclosed herein, the network may select between short-duration UL bursts 604 and long-duration UL bursts 608 for UL control channel transmissions based on factors, parameters and application needs associated with a link. The selection between short-duration UL bursts 604 and long-duration UL bursts 608 can determine or affect feedback delays. The network may configure feedback delay by selecting between short-duration UL bursts 604 and long-duration UL bursts 608 for UL control channel transmissions.

In one example, the network may select between short-duration UL bursts and long-duration UL bursts for UL control channel transmissions based on UE power headroom. The UE may be configured to operate within a power budget that can determine the power available to transmit the UL control channel. The UE may use more power to transmit to a base station that is geographically remote than to a base station that is geographically proximate. The power available for UL control channel transmissions may be limited by the available power headroom or available power margin. Power headroom/margin may be defined as the difference between budgeted power and the power used for other transmissions. Power headroom/margin may indicate power available for UL control channel transmissions. For example, when the UE is far away from a base station, power headroom may be small or even zero. The power headroom may be zero when the UE is already transmitting at peak budgeted power. On the other hand, if the UE is located near to the base station, power headroom can be relatively large. The UE may continuously or continually report power headroom to the base station. The network may select between short-duration UL bursts and long-duration UL bursts for UL control channel transmissions based on the reported UE power headroom.

Figure 7:
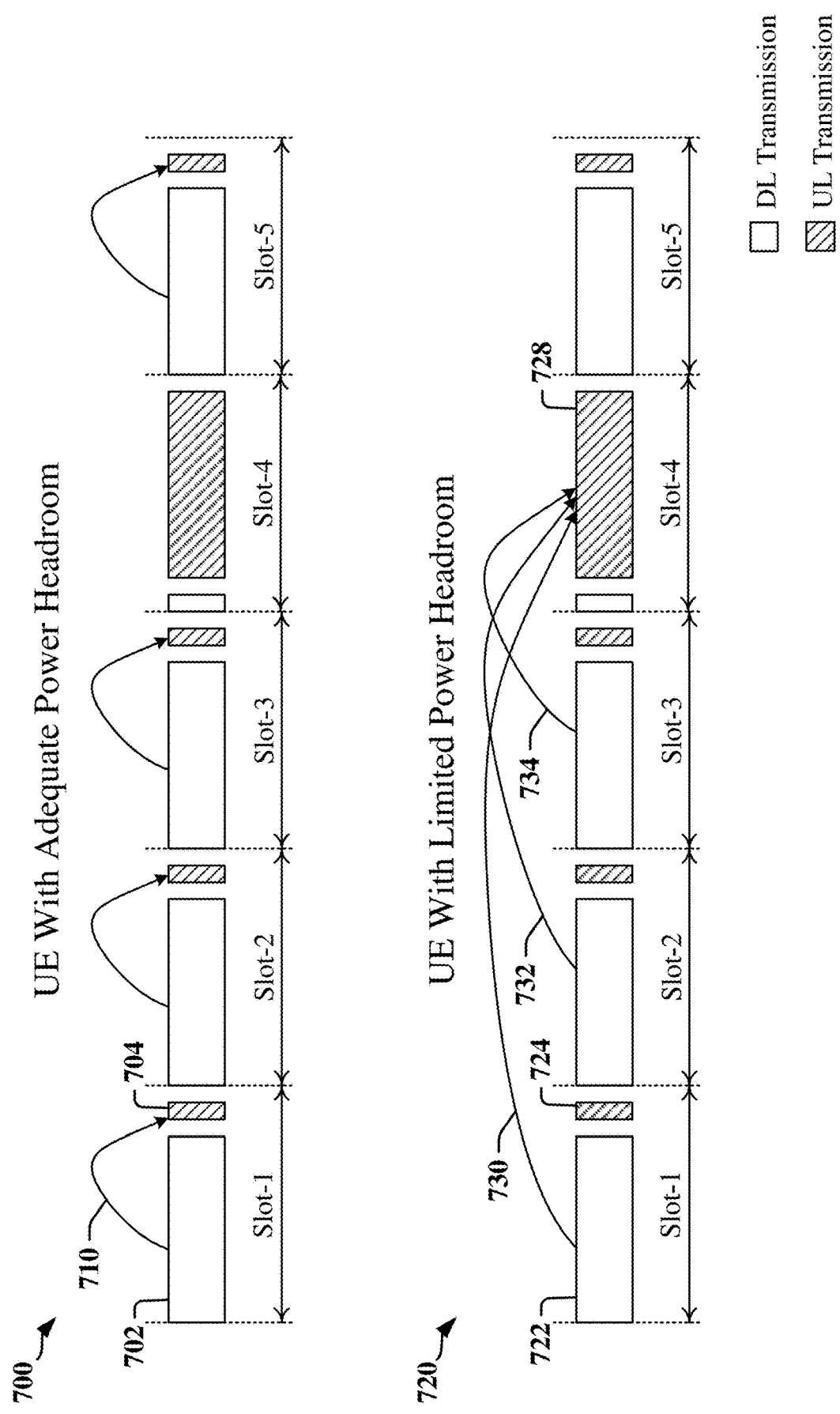
FIG. 7 illustrates examples of UL control channel transmissions schedules that may be configured based on reported UE power headroom according to one aspect of the disclosure.

FIG. 7 illustrates examples 700, 720 of UL control channel transmissions schedules that may be configured based on reported UE power headroom. In a first example 700, the network recognizes that the UE has sufficient headroom to transmit the UL control channel in a short-duration UL burst 704. In this example 700, the network may configure the UE to provide UL feedback 710 corresponding to a DL burst 702 in a short-duration UL burst 704 in the same slot.

In a second example 720, the network may recognize that the UE has insufficient headroom to reliably transmit the UL control channel in a short-duration UL control burst 724. In this example 720, the network may configure the UE to provide UL feedback 730, 732, 734 corresponding to one or more DL bursts 722 in a long-duration UL control burst 728. The long-duration UL control burst 728 may be provided in a different slot. The base station may configure the UE to transmit some or all of the UL feedback 730, 732, 734 for DL bursts preceding the long-duration UL control burst 728 in the long-duration UL control burst 728.

The UL feedback 730, 732, 734 may include a variety of different Uplink Control Information (UCI) fields. In some instances, the UE may be configured to transmit some or all of the UCI fields for each UL feedback 730, 732, 734 in a long-duration UL control burst 728. In one example, the UE may be configured to transmit ACK bits in a short-duration UL control burst 724, while other UCI fields are transmitted in a long-duration UL control burst 728.

The network may configure physical resources used by the UE based on the UL control channel transmissions scheduled for the UE. For example, when the base station has configured the UE to use short-duration UL control bursts 724 and/or long-duration UL control bursts 728, the base station may configure the UE to use certain physical resources, which may be identified as physical resource blocks (PRBs). A base station may explicitly identify the physical resources by semi-statically or dynamically configuring the UE to use certain PRBs. In one example, the base station may semi-statically configure PRB usage at the UE through RRC signaling. In another example, the base station may dynamically configure PRB usage at the UE through downlink control information (DCI) transmitted in PDCCH, or another downlink control channel.

In some instances, the UE may implicitly know the allocation of a PRB for UCI. For example, the UE may calculate the PRB for the UCI using the location of the PDCCH and/or the location of the PDSCH. The UE may use different mapping formulas for locating a PRB used for UCI in short-duration UL control bursts 724 and in long-duration UL control bursts 728.

According to certain aspects, the base station may configure the UE with power control for short-duration UL control bursts 724 that is different from the power control configured for long-duration UL control bursts 728. That is, the power settings used by the UE when transmitting feedback in long-duration UL control bursts 728 can be different from the power settings used by the UE to transmit in short-duration UL control bursts 724. The base station may aggregate power over a longer period of time in the long-duration UL control bursts 728 than the period of time available in the short-duration UL control bursts 724. In one example, the UE can apply a fixed power offset to the operating points between short-duration UL control bursts 724 and long-duration UL control bursts 728. The power control difference may be configured for closed loop and/or open loop power control schemes.

According to certain aspects, a network may select between short-duration UL control bursts 724 and long-duration UL control bursts 728 for UL control channel transmissions based on UL interference and/or loading.

In addition to considerations of UE-reported power headroom, the network can configure transmissions of feedback by the UE based on measured or detected interference in UL transmissions. A base station may configure the UE to move UL feedback transmissions from short-duration UL control bursts 724 to long-duration UL control bursts 728, or vice versa, when one channel suffers more interference than the other. Interference may be attributed to other nearby cells or UEs, for example.

In one example, interference may be determined or quantified by measuring signal-to-interference-and-noise ratio (SINR) at receive antennas of base stations and/or UEs. The base station may also receive interference measurements from other base stations. SINR measurements may be obtained using SRS or other pilot signals transmitted by the UE. A base station may transmit reference signals that provide for channel estimation. A UE may measure channel quality using the reference signals, and may feed CQI and RI values back to the base station.

In some instances, the network may configure transmissions of feedback by the UE based on network loading. A base station may configure the UE to move UL feedback transmissions from short-duration UL control bursts 724 to long-duration UL control bursts 728, when the network is loaded and the control channel capacity is limited in the short-duration UL control bursts 724, for example.

Figure 8:
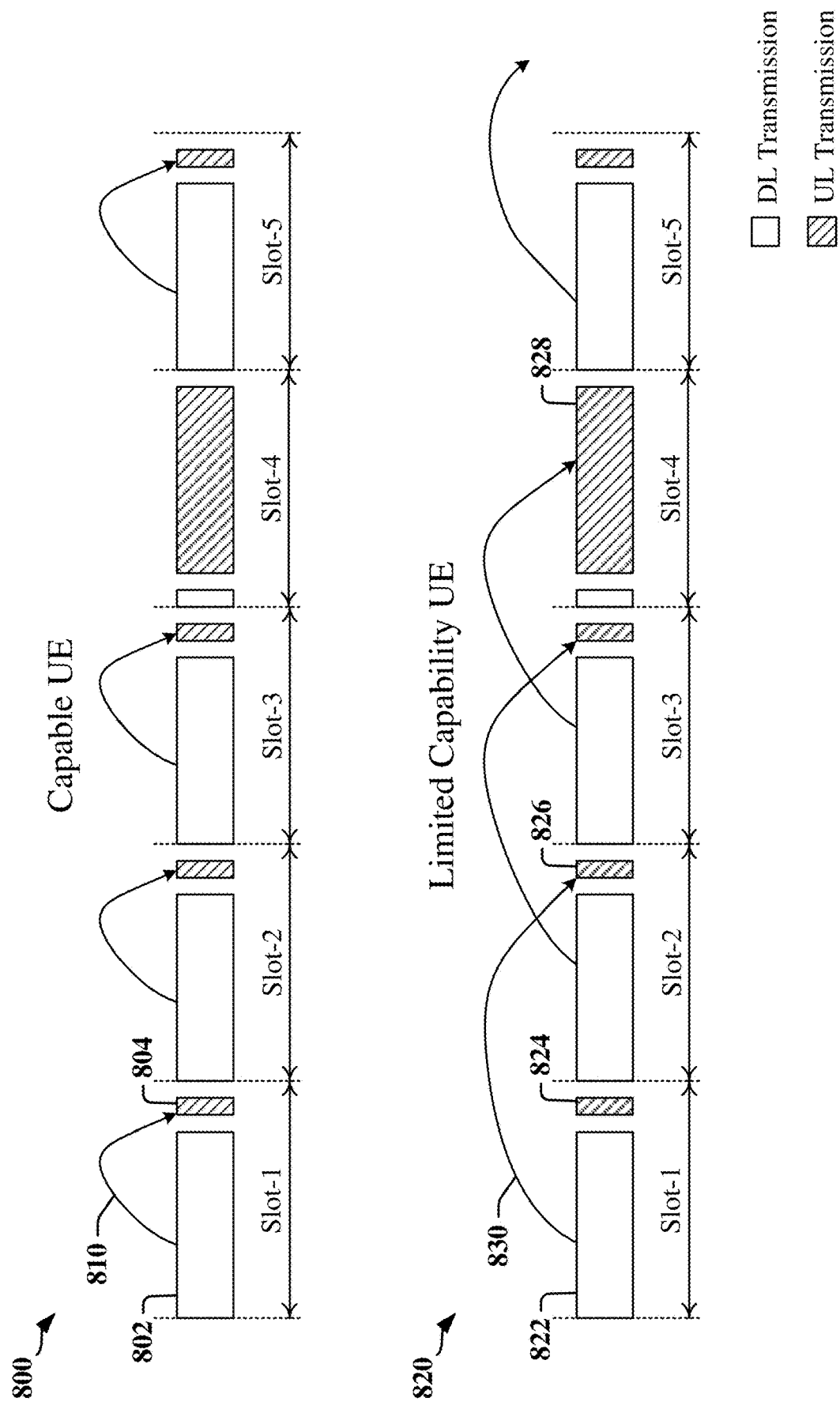
FIG. 8 is a diagram illustrating examples of UL control channel transmissions that may be scheduled based on available UE capabilities including processing power according to one aspect of the disclosure.

FIG. 8 illustrates examples 800, 820 of UL control channel transmissions that may be scheduled based on available UE processing power. In these examples 800, 820, short-duration UL control bursts 804, 824 are configured to be available in every slot that carries a long-duration DL burst 802, 822. In the first example 800, the UE has sufficient processing capability to decode a scheduled packet in a long-duration DL burst 802 quickly and may be able to send an acknowledgement as feedback 810 immediately. For example, the feedback 810 may be transmitted in a short-duration UL control burst 804 within the same slot. In this first example 800, the UL feedback delay may be configured for zero slots (i.e., transmit in the same slot). In the second example 820, the UE may not have sufficient processing capability to decode a scheduled packet in a long-duration DL burst 822 quickly and/or may not be able to send immediate acknowledgement in the short-duration UL control burst 824. In this second example 820, the UE may transmit the feedback 830 after a delay of K slots, where K>0. In the illustrated second example 820, K=1 slot delay. The slot delay may indicate a short-duration UL control burst 826 or short-duration UL control burst 828 to be used.

In some instances, short uplink control transmission opportunities are not provided for every slot. In one example, DL slot aggregation may be configured for the UE. In another example, a millimeter wave implementation may be involved and the base station may need to use beamforming to direct energy in the direction of specific individual UEs in order to successfully receive and decode the UL signal. In such examples, an opportunity for UL feedback may not be provided in every slot, and the network may schedule the UE to transmit UL feedback based on UL control burst availability.

FIG. 9 illustrates examples 900, 940 of UL feedback scheduling based on UL control burst availability. In many instances, the feedback delay is not fixed for all packets. In a first example 900, the base station may explicitly configure a feedback delay for each DL slot 902, 904, 906. The base station can use DL control information 912, 914, 916 to explicitly inform the UE when feedback 922, 924, 926 for the slots can be sent. The base station may explicitly configure the feedback delay for each slot 902, 904, 906 in DL control information 912, 914, 916 transmitted at the beginning of each slot 902, 904, 906. In the first example 900, the base station configures the 2-slot delay applicable to the first slot 902 using DL control information 912, and based on the scheduling of the next short-duration UL control burst 908. Feedback 924, 926 for subsequent slots may be scheduled for 1-slot and 0-slot delays, respectively by configuring DL control information 914 and 916, respectively.

In a second example 940, the feedback delay for each slot may be implicitly available to the UE. At the beginning of a group of DL slots for which feedback is to be aggregated, the network may notify the UE of the timing of the next short-duration UL control burst 944. In some instances, a base station may identify the short-duration UL control burst 944 in DL control information 952 transmitted at the beginning of the first DL slot 942. For each DL slot, the UE can determine delays for transmitting feedback 946, 948, 950 associated with the corresponding DL slots, and based on scheduling of the slot relative to the short-duration UL control burst 944.

Figure 10:
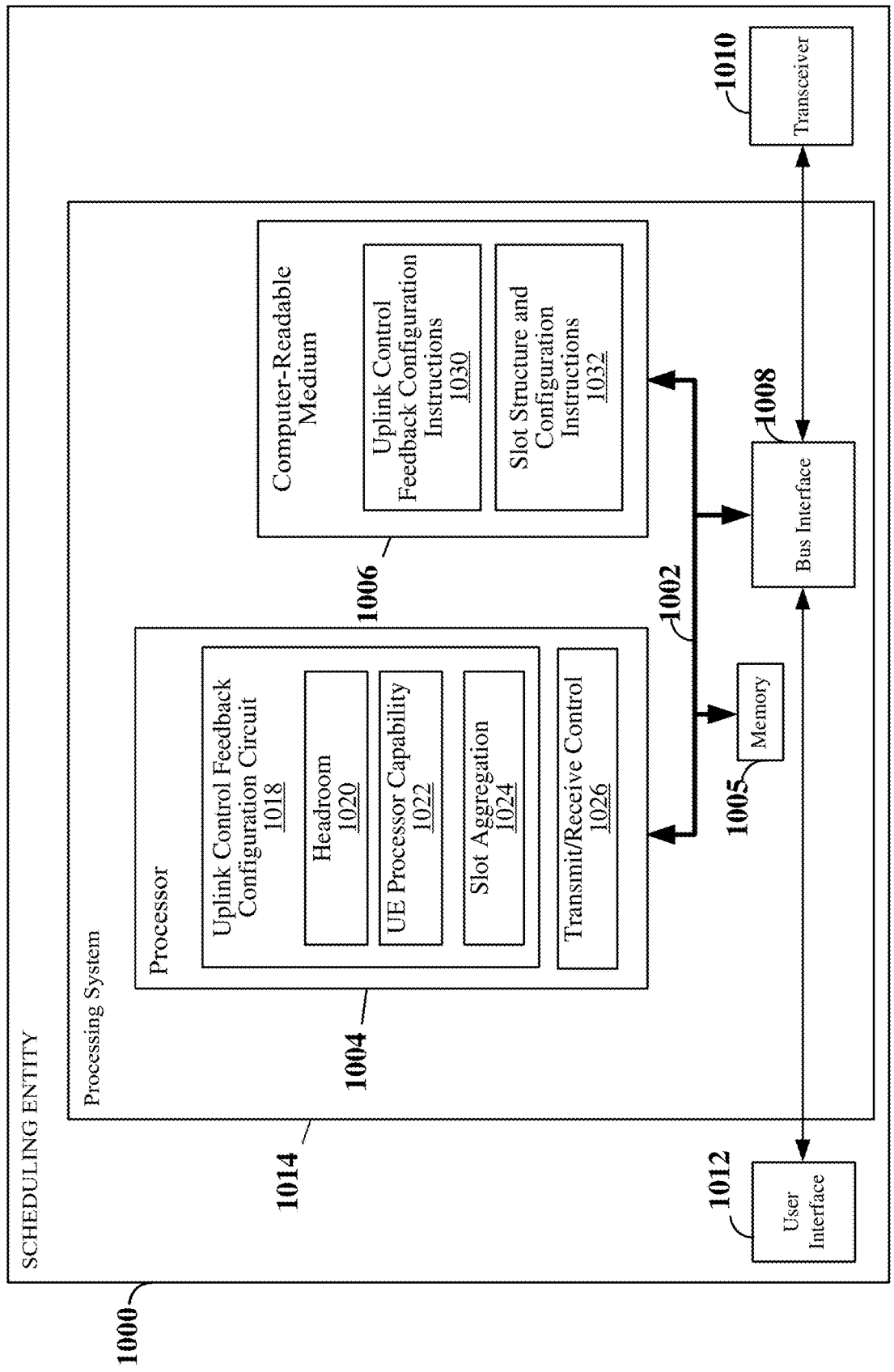
FIG. 10 is a block diagram illustrating an example of a hardware implementation for a scheduling entity employing a processing system according to one aspect of the disclosure.

FIG. 10 is a simplified block diagram illustrating an example of a hardware implementation for a scheduling entity 1000 employing a processing system 1014. For example, the scheduling entity 1000 may be a user equipment (UE) as illustrated in any one or more of FIGS. 1 and/or 2. In another example, the scheduling entity 1000 may be a base station as illustrated in any one or more of FIGS. 1 and/or 2.

The scheduling entity 1000 may be implemented with a processing system 1014 that includes one or more processors 1004. Examples of processors 1004 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the scheduling entity 1000 may be configured to perform any one or more of the functions and processes described herein. That is, the processor 1004, as utilized in a scheduling entity 1000, may be used to implement any one or more of the processes and functions utilizing the slot structures described below and illustrated in FIGS. 6-9.

In some aspects of the disclosure, the processor 1004 may include an uplink control feedback configuration block 1018 that may be configured to perform the communication functions and processes described in FIGS. 6-9. In one example, the uplink control feedback configuration block 1018 may include a scheduled entity power headroom determination block 1020, a scheduled entity processing capability determination block 1022, and a slot aggregation management block 1024.

The scheduled entity power headroom determination block 1020, the scheduled entity processing capability determination block 1022, and the slot aggregation management block 1024 may be used to determine a type of UL control burst to be used by the scheduled entity for feedback.

In this example, the processing system 1014 may be implemented with a bus architecture, represented generally by the bus 1002. The bus 1002 may include any number of interconnecting buses and bridges depending on the specific application of the processing system 1014 and the overall design constraints. The bus 1002 communicatively couples together various circuits including one or more processors (represented generally by the processor 1004), a memory 1005, and computer-readable media (represented generally by the computer-readable medium 1006). The bus 1002 may also link various other circuits such as timing sources, peripherals, voltage regulators, and power management circuits, which are well known in the art, and therefore, will not be described any further. A bus interface 1008 provides an interface between the bus 1002 and a transceiver 1010. The transceiver 1010 provides a communication interface or a means for communicating with various other apparatus over a transmission medium. The transceiver may be operated and/or controlled using a transmitter control module 1026 that may include or interact with timers, framers, encoders and the like. Depending upon the nature of the apparatus, a user interface 1012 (e.g., keypad, display, speaker, microphone, joystick) may also be provided.

The processor 1004 is responsible for managing the bus 1002 and general processing, including the execution of software stored on the computer-readable medium 1006. The software, when executed by the processor 1004, causes the processing system 1014 to perform the various functions described below for any particular apparatus. The computer-readable medium 1006 and the memory 1005 may also be used for storing data that is manipulated by the processor 1004 when executing software.

The computer-readable medium 1006 may be stored with uplink control feedback configuration code 1030 that may be executed by the processor 1004 to perform various communication functions and processes as described in relation to FIGS. 6-9. For example, the processor 1004 when executing the uplink control feedback configuration code 1030 may utilize a plurality of slot structures 1032 to communicate with one or more scheduled entities as illustrated in FIGS. 6-9.

One or more processors 1004 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 1006. The computer-readable medium 1006 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium 1006 may reside in the processing system 1014, external to the processing system 1014, or distributed across multiple entities including the processing system 1014 and a network storage. The computer-readable medium 1006 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

In one configuration, the scheduling entity 1000 has means 1018, 1020, 1022, 1024 for generating scheduling information to be transmitted to a scheduled entity. The scheduling information may include information that schedules transmission of uplink control information by the scheduled entity. The scheduled entity 1100 may have means 1104, 1110, 1026 for wireless transmitting information to the scheduled entity. The information may be transmitted in frames that include a plurality of slots. The plurality of slots may include two or more slots having a long downlink burst and a short uplink control burst. The plurality of slots may include at least one slot having a short downlink control burst and a long uplink burst. The scheduling information may include information that causes the scheduled entity to select between a short uplink control burst and a long uplink burst for transmission of the uplink control information.

In one example, the scheduling entity 1000 has means 1104, 1110, 1020, 1026 for receiving and determining information identifying power available at the scheduled entity for transmission of uplink control information in the short uplink control burst. The means 1018, 1020, 1022, 1024 for generating scheduling information may be configured to generate the scheduling information based on the information identifying power available at the scheduled entity by selecting the long uplink burst for transmission of the uplink control information when there is insufficient power available for reliable transmission of the uplink control information in the short uplink control burst, and selecting the short uplink control burst for transmission of the uplink control information when there is sufficient power available for reliable transmission of the uplink control information in the short uplink control burst.

In one example, the means 1018, 1020, 1022, 1024 for generating scheduling information is configured to obtain a measurement of interference in one or more uplink transmissions, and configure the scheduling information such that the scheduled entity is caused to select between the short uplink control burst and the long uplink burst for transmission of the uplink control information based on the measurement of interference in the one or more uplink transmissions.

In another example, the means 1018, 1020, 1022, 1024 for generating scheduling information may be configured to generate the scheduling information such that the scheduled entity is configured to transmit the uplink control information in the lesser loaded one of the short uplink control burst and the long uplink burst.

In one example, the means 1018, 1020, 1022, 1024 for generating scheduling information is configured to generate the scheduling information such that uplink control information corresponding to a plurality of long downlink bursts is scheduled for transmission in a common short uplink control burst or long uplink burst.

Figure 11:
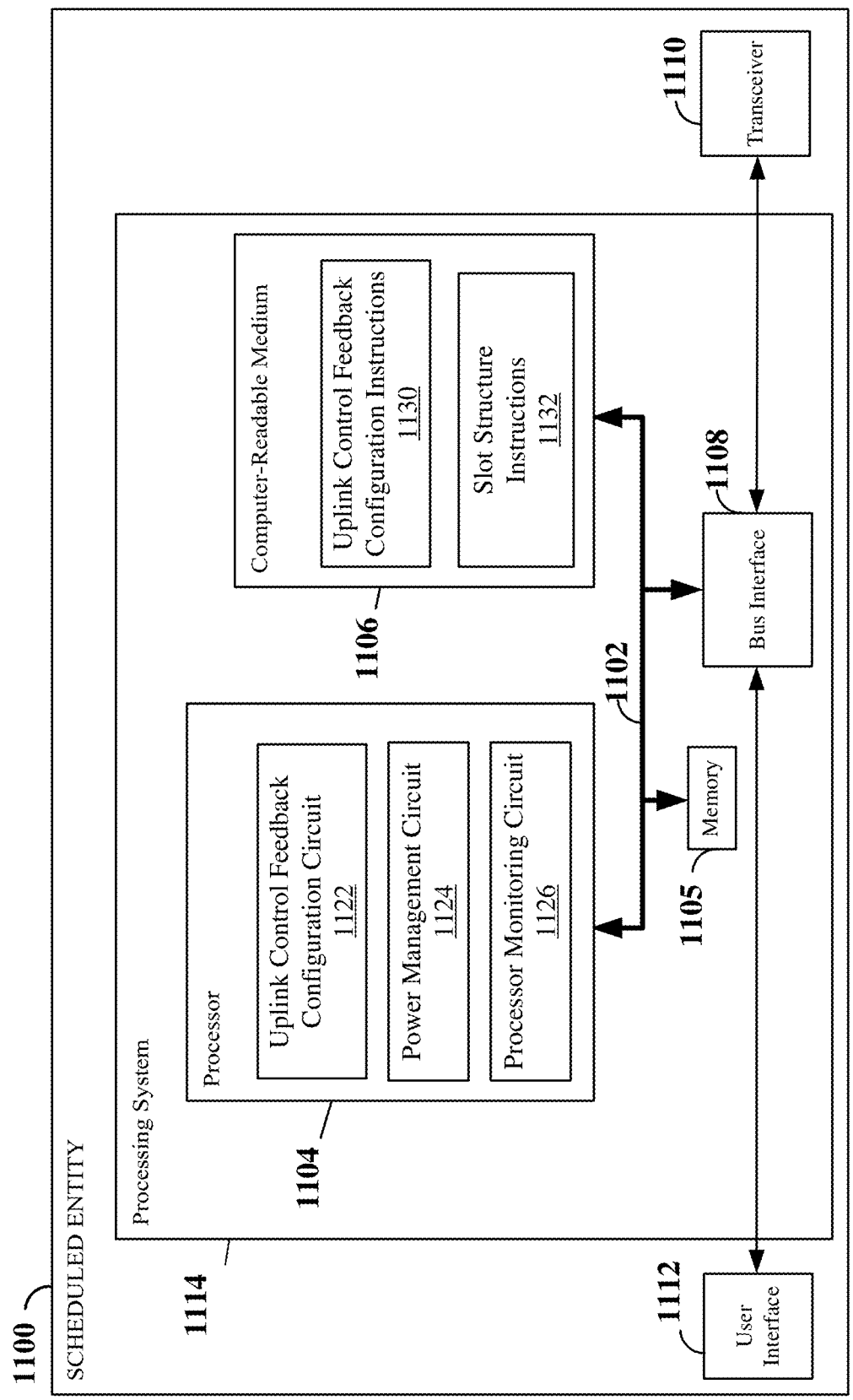
FIG. 11 is a block diagram illustrating an example of a hardware implementation for a scheduled entity employing a processing system according to one aspect of the disclosure.

FIG. 11 is a conceptual diagram illustrating an example of a hardware implementation for an example of a scheduled entity 1100 employing a processing system 1114. In accordance with various aspects of the disclosure, an element, or any portion of an element, or any combination of elements may be implemented with a processing system 1114 that includes one or more processors 1104. For example, the scheduled entity 1100 may be a user equipment (UE) as illustrated in any one or more of FIGS. 1 and/or 2.

The processing system 1114 may be substantially the same as the processing system 1014 illustrated in FIG. 10, including a bus interface 1108, a bus 1102, memory 1105, a processor 1104, and a computer-readable medium 1106. Furthermore, the scheduled entity 1100 may include a user interface 1112 and a transceiver 1110 substantially similar to those described above in FIG. 10. That is, the processor 1104, as utilized in a scheduled entity 1100, may be used to implement any one or more of the processes utilizing the slot structures described below and illustrated in FIGS. 6-9.

In some aspects of the disclosure, the processor 1104 may include an uplink control feedback configuration block 1122 that may be configured to perform the communication functions and processes described in FIGS. 6-9 that provide for uplink control feedback configuration. The processor 1104 may include a power management block 1124 that may be configured to report available headroom to the scheduling entity 1000. The processor 1104 may include a processor monitoring block 1126 that may be configured to report processor capability.

The computer-readable medium 1106 may be stored with uplink control feedback configuration code 1130 that may be executed by the processor 1104 to perform various communication functions and processes as described in relation to FIGS. 6-9. For example, the processor 1104 when executing the uplink control feedback configuration code 1130 may utilize a plurality of slot structures 1132 to communicate with a scheduling entity 1000 as described in relation to FIGS. 6-9.

Figure 12:
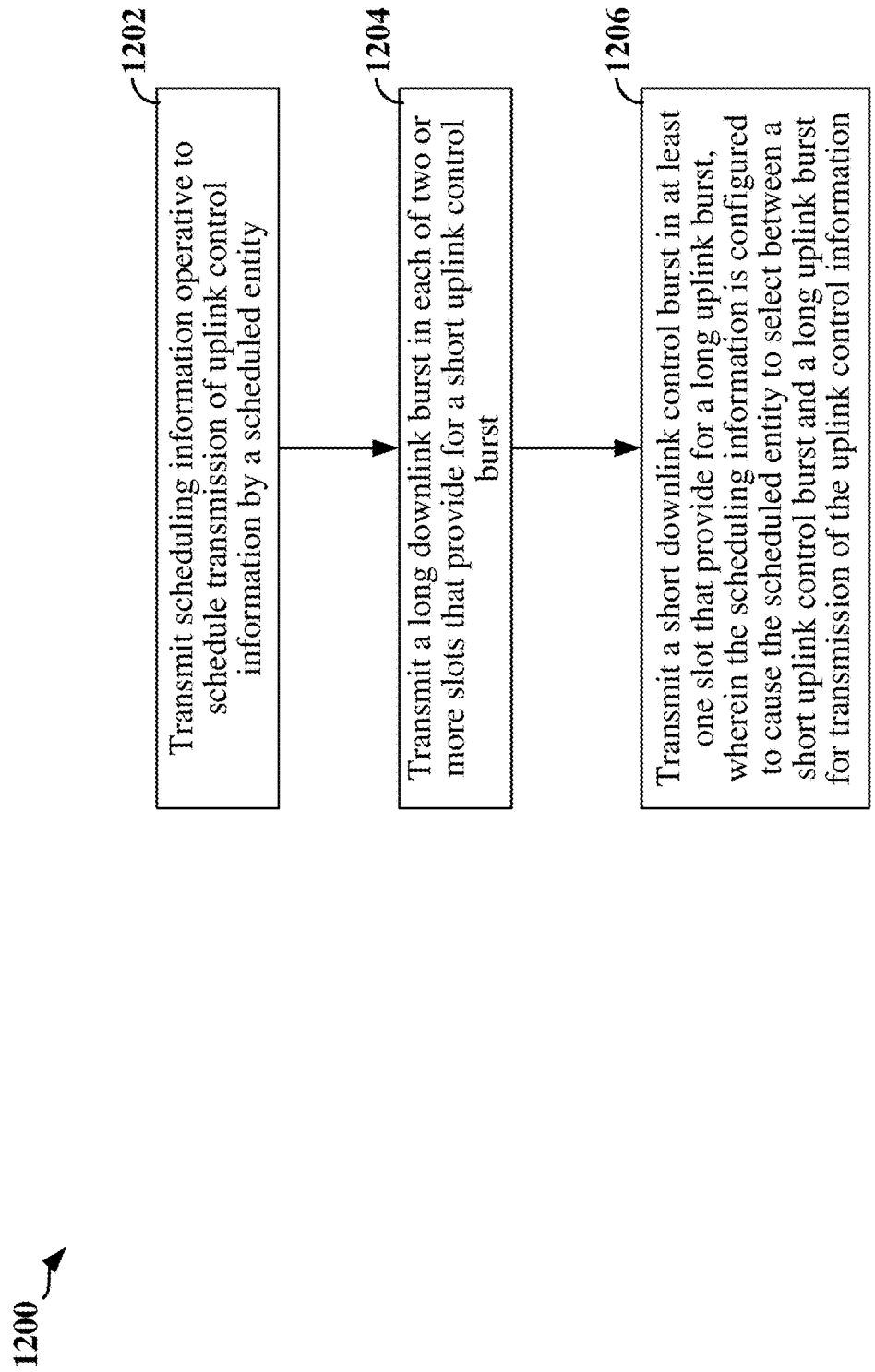
FIG. 12 is a flowchart illustrating a first example of a communication process in which feedback is schedule based on certain operational parameters according to some aspects of the disclosure.

FIG. 12 is a flowchart illustrating a wireless communication process 1200 utilizing a multi-TTI slot in accordance with some aspects of the disclosure. At block 1202, a scheduling entity 1000 may utilize the transceiver 1010 to communicate with one or more scheduled entities 1100 (e.g., a first scheduled entity 204 and a second scheduled entity 204) to transmit scheduling information operative to schedule transmission of uplink control information by a scheduled entity. At block 1204, the scheduling entity 1000 may utilize the transceiver 1010 to communicate with one or more scheduled entities 1100 (e.g., a first scheduled entity 204 and a second scheduled entity 204) to transmit two or more slots that provide for a long downlink burst and a short uplink control burst. At block 1206, the scheduling entity 1000 may utilize the transceiver 1010 to communicate with one or more scheduled entities 1100 (e.g., a first scheduled entity 204 and a second scheduled entity 204) to transmit at least one slot that provides for a short downlink control burst and a long uplink burst. The scheduling information may be configured to cause the scheduled entity to select between a short uplink control burst and a long uplink burst for transmission of the uplink control information.

In some examples, the scheduling entity 1000 may receive information identifying power available at the scheduled entity for transmission of uplink control information in the short uplink control burst. The scheduling entity 1000 may generate the scheduling information based on the information identifying power available at the scheduled entity. The scheduling information may be configured to cause the scheduled entity to select the long uplink burst for transmission of the uplink control information when there is insufficient power available for reliable transmission of the uplink control information in the short uplink control burst, and to select the short uplink control burst for transmission of the uplink control information when there is sufficient power available for reliable transmission of the uplink control information in the short uplink control burst. In one example, power control commands transmitted in DCI carried in the PDCCH determines power available for uplink transmissions by the scheduled entity.

The scheduling entity 1000 may transmit control information operative to cause the scheduled entity to use a first power setting when transmitting the uplink control information in the short uplink control burst, and use a second power setting when transmitting the uplink control information in the long uplink burst. In some examples, generating the scheduling information may include obtaining a measurement of interference in one or more uplink transmissions, and configuring the scheduling information to cause the scheduled entity to select between the short uplink control burst and the long uplink burst for transmission of the uplink control information based on the measurement of interference in the one or more uplink transmissions. The measurement of interference in the one or more uplink transmissions may be obtained by measuring interference affecting resources scheduled for the short uplink control burst and for the long uplink burst, and scheduling uplink control information based on a difference between measurements of interference affecting the short uplink control burst and the long uplink burst. The interference may be measured at the scheduling entity 1000 and/or at one or more scheduled entities 1100. In some instances, measurements of interference may include interference measured by a different scheduling entity 1000. The scheduling entity 1000 may schedule uplink control information in the long uplink burst based on interference affecting the short uplink control burst.

In certain examples, the scheduling entity 1000 may generate the scheduling information such that the scheduled entity is configured to transmit the uplink control information in a lesser loaded one of the short uplink control burst and the long uplink burst.

In some examples, the scheduling entity 1000 may transmit control information operative to configure a feedback delay at the scheduled entity, the feedback delay being based on processing capability of the scheduled entity. The feedback delay may be used by the scheduled entity to determine a slot offset to the short uplink control burst or the long uplink burst to be used for transmission of the uplink control information.

In certain examples, the scheduling entity 1000 may aggregate a plurality of long downlink bursts with one short uplink control burst to obtain aggregated slots, and generate the scheduling information based on timing of the short uplink control burst within the aggregated slots. Feedback associated with each of the plurality of long downlink bursts is transmitted in the one short uplink control burst. Generating the scheduling information may include providing the scheduling information for each downlink burst in downlink control information transmitted in a first-transmitted downlink burst in the aggregated slots. The scheduled entity 1000 may calculate relative timing of the short uplink control burst with respect to each downlink burst in the aggregated slots.

In one example, the scheduling entity 1000 may generate the scheduling information such that uplink control information corresponding to a plurality of long downlink bursts is scheduled for transmission in a common short uplink control burst or long uplink burst.

In certain examples, measurements of interference may be obtained from measurements of SINR at receive antennas at the scheduled entity. The scheduling entity 1000 may also receive measurements of interference from other entities. In some instances, SINR measurements may be obtained using SRS or other pilot signals transmitted on the radio access network. The scheduling entity 1000 may transmit reference signals that provide for channel estimation. A scheduled entity may measure channel quality using the reference signals, and may feed CQI and RI values back to the scheduling entity 1000.

Figure 13:
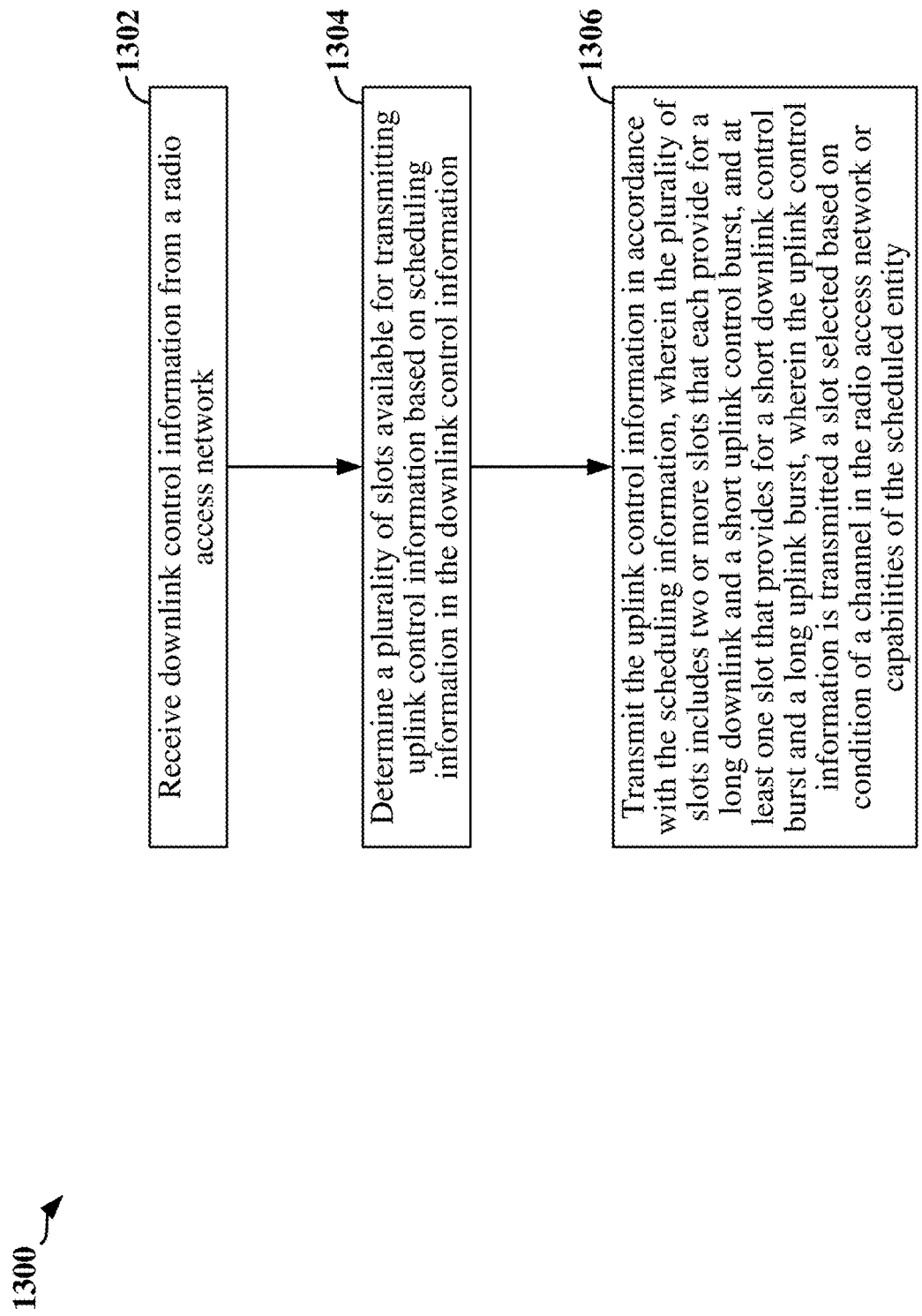
FIG. 13 is a flowchart illustrating a second example of a communication process in which feedback is schedule based on certain operational parameters according to some aspects of the disclosure.

FIG. 13 is a flowchart illustrating a wireless communication process 1300 utilizing a multi-TTI slot in accordance with some aspects of the disclosure. At block 1302, a scheduled entity 1100 may utilize the transceiver 1110 to communicate with a scheduling entity 1000 (e.g., a scheduling entity 202) to receive downlink control information from a radio access network. At block 1304, the scheduled entity 1100 may determine a plurality of slots available for transmitting uplink control information based on scheduling information in the downlink control information. At block 1306, the scheduled entity 1100 may transmit the uplink control information in accordance with the scheduling information. The plurality of slots may include two or more slots that each provide for a long downlink burst and a short uplink control burst. At least one slot provides for a short downlink control burst and a long uplink burst. The uplink control information may be transmitted in a slot selected based on condition of a channel in the radio access network or capabilities of the scheduled entity.

In some examples, the scheduled entity 1100 may calculate available power for transmitting the uplink control information by the scheduled entity based on the downlink control information, transmit an indication of the available power over the radio access network. The scheduling information may be based on the indication of the available power transmitted by the scheduled entity. In one example, power control commands transmitted in DCI carried in the PDCCH determines power available for uplink transmissions by the scheduled entity. The long uplink burst may be selected for transmission of the uplink control information when there is insufficient power available for reliable transmission of the uplink control information in the short uplink control burst. The short uplink control burst may be selected for transmission of the uplink control information when there is sufficient power available for reliable transmission of the uplink control information in the short uplink control burst Sufficiency of power may be determined based on the indication of available power.

In some examples, the scheduled entity 1100 may use a first power setting when transmitting the uplink control information in the short uplink control burst responsive to the control information. The scheduled entity 1100 may use a second power setting when transmitting the uplink control information in the long uplink burst.

In some examples, the scheduled entity 1100 may select between the short uplink control burst and the long uplink burst for transmission of the uplink control information based on a measurement of interference in the one or more uplink transmissions. In certain examples, measurements of interference may be obtained from measurements of SINR at receive antennas at the scheduled entity. The scheduling entity 1000 may also receive measurements of interference from other entities, including the scheduled entity 1100. In some instances, SINR measurements may be obtained using SRS or other pilot signals transmitted on the radio access network. A scheduling entity 1000 may transmit reference signals that provide for channel estimation. A scheduled entity 1100 may measure channel quality using the reference signals, and may feed CQI and RI values back to the scheduling entity 1000. The measured interference may affect resources scheduled for the short uplink control burst and for the long uplink burst. Uplink control transmissions may be scheduled based on a difference between measurements of interference affecting the short uplink control burst and the long uplink burst. Uplink control information may be scheduled in the long uplink burst based on interference affecting the short uplink control burst.

In one example, the scheduled entity 1100 may transmit the uplink control information in a lesser loaded one of the short uplink control burst and the long uplink burst.

In some examples, the scheduled entity 1100 may transmit the uplink control information in a slot occurring after a feedback delay based on processing capability of the scheduled entity. The feedback delay may be determined from the downlink control information.

In various examples, the scheduled entity 1100 may transmit the long downlink burst by transmitting uplink control information, including feedback associated with each of a plurality of aggregated slots, in one short uplink control burst in the plurality of aggregated slots. The aggregated slots may include a plurality of long downlink bursts and the one short uplink control burst. The scheduling information may include scheduling information for each downlink burst in downlink control information transmitted in a first-transmitted downlink burst in the aggregated slots. The scheduled entity may calculate relative timing of the short uplink control burst with respect to each downlink burst in the aggregated slots. The scheduling information may be generated such that uplink control information corresponding to a plurality of long downlink bursts is scheduled for transmission in a common short uplink control burst or long uplink burst.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-19 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1-19 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

What is claimed is:

1. A method of wireless communication operable at a scheduled entity, comprising:
   transmitting control information to a scheduling entity, the control information identifying processing capability of the scheduled entity or quantifying interference experienced by the scheduled entity;
   receiving scheduling information from the scheduling entity, wherein the scheduling information is configured based on the control information transmitted to the scheduling entity;
   receiving a long downlink burst in a first slot that provides for a short uplink control burst; and
   transmitting feedback corresponding to the long downlink burst in accordance with the scheduling information received from the scheduling entity,
   wherein the feedback is transmitted in the short uplink control burst of the first slot when the scheduled entity is capable of decoding the long downlink burst before the short uplink control burst is scheduled for transmission and when a power budget of the scheduled entity permits the feedback to be transmitted in the short uplink control burst, and
   wherein the feedback is transmitted in a second slot when the scheduled entity is not expected to decode the long downlink burst before the short uplink control burst is scheduled for transmission.

2. The method of claim 1, wherein the control information transmitted to the scheduling entity includes information identifying power available at the scheduled entity for transmission of uplink control information in the short uplink control burst.

3. The method of claim 1, further comprising:
   transmitting the feedback in a long uplink burst of the second slot when there is insufficient power available for reliable transmission of the feedback in the short uplink control burst of the first slot; and
   transmitting the feedback in the short uplink control burst of the first slot when there is sufficient power available for reliable transmission of the feedback in the short uplink control burst of the first slot.

4. The method of claim 3, further comprising:
   using a first power setting when transmitting the uplink control information in the short uplink control burst of the first slot; and
   using a second power setting when transmitting the uplink control information in the long uplink burst of the second slot.

5. The method of claim 1, further comprising:
   obtaining a measurement of interference in one or more transmissions between the scheduled entity and the scheduling entity; and
   quantifying the interference experienced by the scheduled entity based on the measurement of interference in the one or more transmissions.

6. The method of claim 5, wherein obtaining the measurement of interference in the one or more transmissions comprises:
   measuring interference affecting first resources scheduled for the short uplink control burst and interference affecting second resources scheduled for an uplink burst in the second slot.

7. The method of claim 1, further comprising:
   configuring a feedback delay based on the scheduling information received from the scheduling entity, wherein the feedback delay determines an offset between the first slot and the second slot.

8. The method of claim 1, wherein the first slot and the second slot are included in a plurality of aggregated slots, each aggregated slot including a long downlink burst and a short uplink burst.

9. The method of claim 8, further comprising:
   transmitting the feedback in a short uplink burst of the second slot, the second slot being selected based on the scheduling information.

10. The method of claim 9, wherein feedback associated with two or more long downlink bursts is transmitted in the short uplink control burst of the second slot.

11. The method of claim 9, further comprising:
receiving the scheduling information for each downlink burst in the plurality of aggregated slots in downlink control information received in a first-transmitted downlink burst in the plurality of aggregated slots; and
calculating relative timing of the short uplink control burst of the first slot with respect to each downlink burst in the aggregated slots.

12. The method of claim 1, further comprising:
transmitting uplink control information corresponding to a plurality of long downlink bursts in a common short uplink control burst or a common long uplink burst.

13. A scheduled entity configured for wireless communication, comprising:
a communication interface configured to communicate wirelessly with one or more scheduling entities; and
a processor coupled to the communication interface, wherein the processor is configured to:
transmit control information to a scheduling entity, the control information identifying processing capability of the scheduled entity or quantifying interference experienced by the scheduled entity;
receive scheduling information from the scheduling entity, wherein the scheduling information is configured based on the control information transmitted to the scheduling entity;
receive a long downlink burst in a first slot that provides for a short uplink control burst; and
transmit feedback corresponding to the long downlink burst in accordance with the scheduling information received from the scheduling entity,
wherein the feedback is transmitted in the short uplink control burst of the first slot when the scheduled entity is capable of decoding the long downlink burst before the short uplink control burst is scheduled for transmission and when a power budget of the scheduled entity permits the feedback to be transmitted in the short uplink control burst, and wherein the feedback is transmitted in a second slot when the scheduled entity is not expected to decode the long downlink burst before the short uplink control burst is scheduled for transmission.

14. The scheduled entity of claim 13, wherein the control information transmitted to the scheduling entity includes information identifying power available at the scheduled entity for transmission of uplink control information in the short uplink control burst.

15. The scheduled entity of claim 13, wherein the processor is further configured to:
transmit the feedback in a long uplink burst of the second slot when there is insufficient power available for reliable transmission of the feedback in the short uplink control burst of the first slot; and
transmit the feedback in the short uplink control burst of the first slot when there is sufficient power available for reliable transmission of the feedback in the short uplink control burst of the first slot.

16. The scheduled entity of claim 15, wherein the processor is further configured to:
use a first power setting when transmitting the uplink control information in the short uplink control burst of the first slot; and
use a second power setting when transmitting the uplink control information in the long uplink burst of the second slot.

17. The scheduled entity of claim 13, wherein the processor is further configured to:
obtain a measurement of interference in one or more transmissions between the scheduled entity and the scheduling entity; and
quantify the interference experienced by the scheduled entity based on the measurement of interference in the one or more transmissions.

18. The scheduled entity of claim 17, wherein the processor is further configured to:
measure interference affecting first resources scheduled for the short uplink control burst and interference affecting second resources scheduled for an uplink burst in the second slot.

19. The scheduled entity of claim 13, wherein the processor is further configured to:
configure a feedback delay based on the scheduling information received from the scheduling entity, wherein the feedback delay determines an offset between the first slot and the second slot.

20. The scheduled entity of claim 13, wherein the first slot and the second slot are included in a plurality of aggregated slots, each aggregated slot including a long downlink burst and a short uplink burst.

21. The scheduled entity of claim 20, wherein the processor is further configured to:
transmit the feedback in a short uplink burst of the second slot, the second slot being selected based on the scheduling information.

22. The scheduled entity of claim 21, wherein feedback associated with two or more long downlink bursts is transmitted in the short uplink control burst of the second slot.

23. The scheduled entity of claim 21, wherein the processor is further configured to:
receive the scheduling information for each downlink burst in the plurality of aggregated slots in downlink control information received in a first-transmitted downlink burst in the plurality of aggregated slots; and
calculate relative timing of the short uplink control burst of the first slot with respect to each downlink burst in the aggregated slots.

24. The scheduled entity of claim 13, wherein the processor is further configured to:
transmit uplink control information corresponding to a plurality of long downlink bursts in a common short uplink control burst or a common long uplink burst.

25. A non-transitory computer-readable storage medium comprising executable code for causing a scheduled entity to:
transmit control information to a scheduling entity, the control information identifying processing capability of the scheduled entity or quantifying interference experienced by the scheduled entity;
receive scheduling information from the scheduling entity, wherein the scheduling information is configured based on the control information transmitted to the scheduling entity;
receive a long downlink burst in a first slot that provides for a short uplink control burst; and
transmitting feedback corresponding to the long downlink burst in accordance with the scheduling information received from the scheduling entity,
wherein the feedback is transmitted in the short uplink control burst of the first slot when the scheduled entity is capable of decoding the long downlink burst before the short uplink control burst is scheduled for transmission and when a power budget of the scheduled entity permits the feedback to be transmitted in the short uplink control burst, and wherein the feedback is transmitted in a second slot when the scheduled entity is not expected to decode the long downlink burst before the short uplink control burst is scheduled for transmission.

26. The non-transitory computer-readable storage medium of claim 25, and further comprising code for causing the scheduled entity to:
configure a feedback delay based on the scheduling information received from the scheduling entity, wherein the feedback delay determines an offset between the first slot and the second slot.

27. The non-transitory computer-readable storage medium of claim 25, wherein the first slot and the second slot are included in a plurality of aggregated slots, each aggregated slot including a long downlink burst and a short uplink burst, and further comprising code for causing the scheduled entity to:
transmitting the feedback in a short uplink burst of the second slot, the second slot being selected based on the scheduling information, wherein feedback associated with two or more long downlink bursts is transmitted in the short uplink control burst of the second slot.

28. An apparatus adapted to communicate as a scheduled entity in a wireless network, comprising:
means for transmitting control information to a scheduling entity, the control information identifying processing capability of the scheduled entity or quantifying interference experienced by the scheduled entity;
means for receiving scheduling information from the scheduling entity, wherein the scheduling information is configured based on the control information transmitted to the scheduling entity;
means for receiving a long downlink burst in a first slot that provides for a short uplink control burst; and
means for transmitting feedback corresponding to the long downlink burst in accordance with the scheduling information received from the scheduling entity,
wherein the feedback is transmitted in the short uplink control burst of the first slot when the scheduled entity is capable of decoding the long downlink burst before the short uplink control burst is scheduled for transmission and when a power budget of the scheduled entity permits the feedback to be transmitted in the short uplink control burst, and
wherein the feedback is transmitted in a second slot when the scheduled entity is not expected to decode the long downlink burst before the short uplink control burst is scheduled for transmission.

29. The apparatus of claim 28, wherein a feedback delay configured based on the scheduling information received from the scheduling entity determines an offset between the first slot and the second slot.

30. The apparatus of claim 28, wherein the first slot and the second slot are included in a plurality of aggregated slots, each aggregated slot including a long downlink burst and a short uplink burst, and wherein the means for transmitting the feedback is configured to:
transmit the feedback in a short uplink burst of the second slot, the second slot being selected based on the scheduling information,
wherein feedback associated with two or more long downlink bursts is transmitted in the short uplink control burst of the second slot.

\* \* \* \* \*